US012646261B2

(12) United States Patent
Kawashima et al.

(10) Patent No.: US 12,646,261 B2
(45) Date of Patent: Jun. 2, 2026

(54) INFORMATION PROCESSING APPARATUS, INFORMATION PROCESSING METHOD, AND PROGRAM

(71) Applicant: Sony Group Corporation, Tokyo (JP)

(72) Inventors: Manabu Kawashima, Tokyo (JP); Daiki Yamanaka, Tokyo (JP); Takashi Seno, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 118 days.

(21) Appl. No.: 18/683,952

(22) PCT Filed: Mar. 22, 2022

(86) PCT No.: PCT/JP2022/013008
§ 371 (c)(1),
(2) Date: Feb. 15, 2024

(87) PCT Pub. No.: WO2023/032316
PCT Pub. Date: Mar. 9, 2023

(65) Prior Publication Data
US 2025/0191301 A1      Jun. 12, 2025

(30) Foreign Application Priority Data

Aug. 31, 2021    (JP) ................................. 2021-141071

(51) Int. Cl.
*G06T 17/00*        (2006.01)
*A63F 13/537*       (2014.01)
(Continued)
(52) U.S. Cl.
CPC ............ *G06T 19/00* (2013.01); *A63F 13/537* (2014.09); *G06T 17/20* (2013.01)

(58) Field of Classification Search
None
See application file for complete search history.

(56) References Cited

U.S. PATENT DOCUMENTS 11,816,757 B1 * 11/2023 Summers ................ G06F 3/012
12,070,684 B2 * 8/2024 Wada ...................... G06T 7/514
(Continued)

FOREIGN PATENT DOCUMENTS

CN      110503001 A    11/2019
CN      113157083 A     7/2021
(Continued)

OTHER PUBLICATIONS

David Filliat et al., "RGBD object recognition and visual texture classification for indoor semantic mapping", Technologies for Practical Robot Applications (TEPRA), 2012 IEEE International Conference on, IEEE, Apr. 23, 2012 (Apr. 23, 2012), pp. 127-132, XP032186069.

*Primary Examiner* — Martin Mushambo
(74) *Attorney, Agent, or Firm* — Paratus Law Group, PLLC

(57)          ABSTRACT

An information processing apparatus (100) includes a control unit (130). The control unit (130) acquires first three-dimensional information related to an occupancy probability of an object in a real space and second three-dimensional information related to an estimation result of a surface shape of the object. The control unit (130) classifies the object based on the first three-dimensional information and floor surface information related to a floor surface in the real space. The control unit (130) highlights the surface of the object classified based on the second three-dimensional information.

13 Claims, 14 Drawing Sheets

(51) Int. Cl.
    *G06T 17/20*         (2006.01)
    *G06T 19/00*         (2011.01)

(56)            References Cited

U.S. PATENT DOCUMENTS

| | | | | |
|---|---|---|---|---|
| 12,361,661 | B1 * | 7/2025 | Cheung | H04L 67/131 |
| 2014/0132484 | A1 * | 5/2014 | Pandey | G06T 11/001 |
| | | | | 345/8 |
| 2014/0287806 | A1 * | 9/2014 | Balachandreswaran | ..................... |
| | | | | A63F 13/285 |
| | | | | 463/7 |
| 2016/0026253 | A1 * | 1/2016 | Bradski | H04N 13/128 |
| | | | | 345/8 |
| 2018/0361240 | A1 * | 12/2018 | Ikenoue | G06F 3/011 |
| 2019/0206142 | A1 * | 7/2019 | Ohashi | A63F 13/65 |

FOREIGN PATENT DOCUMENTS

| | | |
|---|---|---|
| JP | 2008-033819 A | 2/2008 |
| JP | 2020-087339 A | 6/2020 |
| WO | WO 2017/126433 A1 | 7/2017 |
| WO | WO 2017/191702 A1 | 11/2017 |

* cited by examiner

1331

START

HIGHLIGHT OBSTACLE    ~S401

PERFORM SUPPRESSED DISPLAY OF FALSE OBSTACLE    ~S402

GENERATE DISPLAY IMAGE    ~S403

END

WALL

260

R1

OBJECT

B

FLOOR

Occupied

Unknown

Free

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2022/013008 (filed on Mar. 22, 2022) under 35 U.S.C. § 371, which claims priority to Japanese Patent Application No. 2021-141071 (filed on Aug. 31, 2021), which are all hereby incorporated by reference in their entirety.

FIELD

The present disclosure relates to an information processing apparatus, an information processing method, and a program.

BACKGROUND

In recent years, many devices that perform processing according to user's movement have appeared. For example, there is a game that moves a character by synchronizing the character displayed on a screen with the user's movement. When the user always performs operation as in this game, the user becomes too immersed in the operation to notice the surrounding environment. As a result, a problem that the user collides with a surrounding object may occur. In particular, in a case of wearing a head mounted display (HMD) to play and enjoy virtual realty (VR) content, the user may not see the surrounding environment at all. Thus, there is a high risk of colliding with a real object.

In a known technology for detecting the surrounding object, for example, a feature point is extracted from a captured image acquired by a stereo camera, and an object is recognized based on a spatial position of the extracted feature point.

CITATION LIST

Patent Literature

Patent Literature 1: JP 2008-33819 A

SUMMARY

Technical Problem

As described above, since a user who enjoys VR content may not see the surrounding environment at all, there is a high risk of colliding with a real object. Therefore, a system for notifying the user of an obstacle object is expected. The system enables the user to safely enjoy VR content by moving the object or avoiding the object while the user moves.

Therefore, the present disclosure provides a system that enables the user to enjoy content more safely.

Note that the above problem or object is merely one of a plurality of problems or objects that can be solved or achieved by a plurality of embodiments disclosed in the present specification.

Solution to Problem

According to the present disclosure, an information processing apparatus is provided. The information processing apparatus includes a control unit. The control unit acquires first three-dimensional information related to an occupancy probability of an object in a real space and second three-dimensional information related to an estimation result of a surface shape of the object. The control unit classifies the object based on the first three-dimensional information and floor surface information related to a floor surface in the real space. The control unit highlights the surface of the object classified based on the second three-dimensional information.

DESCRIPTION OF EMBODIMENTS

Hereinafter, an embodiment of the present disclosure will be described in detail with reference to the accompanying drawings. Note that, in the present specification and the drawings, components having substantially the same functional configuration are denoted by the same reference signs to omit redundant description.

Furthermore, in the present specification and the drawings, specific values may be indicated and described, but the values are merely examples, and other values may be applied. In addition, in the present specification, the following references may be used in the description.

REFERENCES

[1] Angela Dai, et al. "ScanComplete: Large-Scale Scene Completion and Semantic Segmentation for 3D Scans", CVPR 2018

[2] Margarita Grinvald, et al. "Volumetric Instance-Aware Semantic Mapping and 3D Object Discovery", IROS 2019

[3] Xianzhi Li, et al. "DNF-Net: a Deep Normal Filtering Network for Mesh Denoising", IEEE Transactions on Visualization and Computer Graphics (TVCG) 2020

[4] S. Fleishman, et al. "Bilateral mesh denoising", SIGGRAPH 2003

[5] Raul Mur-Artal, et al. "ORB-SLAM: A Versatile and Accurate Monocular SLAM System", IEEE Transactions on Robotics, vol. 31, no. 5, pp. 1147-1163, October 2015

[6] B. Curless and M. Levoy "A volumetric method for building complex models from range images", In Proceedings of the 23rd annual conference on Computer graphics and interactive techniques, SIGGRAPH '96, pages 303-312, New York, NY, USA, 1996. ACM

[7] William E. Lorensen, Harvey E. Cline: Marching Cubes: A high resolution 3D surface construction algorithm. In: Computer Graphics, Vol. 21, Nr. 4, July 1987

[8] Armin Hornung, et al. "OctoMap: An efficient probabilistic 3D mapping framework based on octrees." Autonomous robots 34.3 (2013): 189-206.

[9] Ruwen Schnabel, et al. "Efficient RANSAC for point-cloud shape detection." Computer graphics forum. Vol. 26. No. 2. Oxford, UK: Blackwell Publishing Ltd, 2007

[10] Kesheng Wu, et al. "Two Strategies to Speed up Connected Component Labeling Algorithms", Published 2005, Mathematics, Computer Science, Lawrence Berkeley National Laboratory In the description below, one or more embodiments (including examples and modifications) may be implemented independently. On the other hand, at least some of the plurality of embodiments described below may be appropriately combined with at least some of other embodiments. The plurality of embodiments may include novel features different from each other. Therefore, the plurality of embodiments may contribute to solving different objects or problems, and may exhibit different effects.

1. Introduction

<1.1. Outline of Information Processing System 1>

Figure 1:
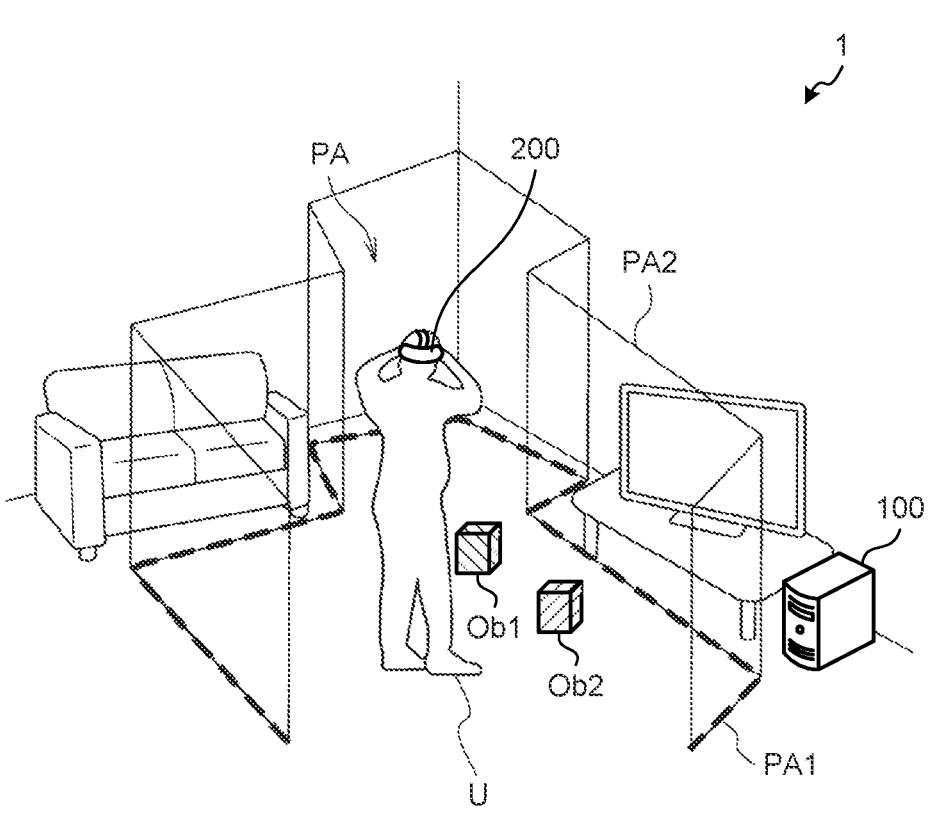
FIG. 1 is a diagram illustrating an outline of an information processing system according to the present disclosure.

FIG. 1 is a diagram illustrating an outline of an information processing system 1 according to the present disclosure. As illustrated in FIG. 1, the information processing system 1 includes an information processing apparatus 100 and a terminal device 200.

The information processing apparatus 100 and the terminal device 200 can communicate with each other via various wired or wireless networks. Note that, as a communication system used in the network, any system can be applied regardless of wired or wireless (e.g., WiFi (registered trademark) and Bluetooth (registered trademark)).

Furthermore, the number of the information processing apparatuses 100 and the number of the terminal devices 200 included in the information processing system 1 are not limited to the number illustrated in FIG. 1, and may be more. Furthermore, FIG. 1 illustrates a case where the information processing system 1 individually includes the information processing apparatus 100 and the terminal device 200, but the present disclosure is not limited thereto. For example, the information processing apparatus 100 and the terminal device 200 may be realized as one apparatus. For example, functions of both the information processing apparatus 100 and the terminal device 200 can be realized by one apparatus such as a standalone HMD.

The terminal device 200 is, for example, a wearable device (eyewear device) such as an eyeglass HMD worn on the head by a user U.

Note that the eyewear device applicable as the terminal device 200 may be a so-called see-through type head mounted display (augmented reality (AR) glasses) that transmits an image in a real space, or may be a goggle type (virtual reality (VR) goggles) that does not transmit the image in the real space.

Furthermore, in the present disclosure, the terminal device 200 is not limited to the HMD, and may be, for example, a tablet, a smartphone, or the like held by the user U.

The information processing apparatus 100 integrally controls the operation of the terminal device 200. The information processing apparatus 100 is realized, for example, by a processing circuit such as a central processing unit (CPU) or a graphics processing unit (GPU). Note that a detailed configuration of the information processing apparatus 100 according to the present disclosure will be described later.

<1.2. Outlines>

<1.2.1. Outline of Obstacle Display Process>

As described above, when the user U wears the HMD or the like and moves, the user U may collide with a real object.

Therefore, in order to ensure physical safety of the user U, the information processing apparatus 100 controls the HMD so that the user U moves in a safe play area (allowable area) that does not come into contact with a real object. This play area may be set by the user U, for example, before starting a game. Alternatively, for example, the play area may be specified by the information processing apparatus 100 based on a sensing result by a sensor or the like provided in the terminal device 200.

For example, in FIG. 1, an area PA is specified as the play area where the user U can move or stretch his/her hand without hitting an obstacle. The play area may be represented as a three-dimensional region such as a combination of a dotted line PA1 illustrated on a floor and a wall PA2 vertically extending from the dotted line PA1. Alternatively, the play area may be represented as a two-dimensional area of the dotted line PA1. In this way, the play area can be set as the two-dimensional area or the three-dimensional area.

Here, as illustrated in FIG. 1, objects Ob1 and Ob2 that will be obstacles (hereinafter also simply referred to as obstacles Ob1 and Ob2) may be included in the area PA specified as the play area (hereinafter also simply referred to as a play area PA).

When the user U sets the play area PA, the play area PA including the obstacles Ob1 and Ob2 may be set by, for example, setting the play area PA same as that played in a previous game, although the obstacles Ob1 and Ob2 exist.

Alternatively, even when the play area PA not including the obstacles Ob1 and Ob2 is set or specified, there is a possibility that the obstacles Ob1 and Ob2 are placed in the play area PA while the user U plays the game.

As described above, when the obstacles Ob1 and Ob2 exist in the play area PA, a system for notifying the user U of the presence of the obstacles Ob1 and Ob2 is desired. The system enables the user U to move the obstacles Ob1 and Ob2 outside the play area PA or avoid the obstacles Ob1 and Ob2 while the user U moves. As a result, safety of the user U can be more reliably ensured.

Conventionally, for example, methods disclosed in the references [1] and [2] are known as methods of detecting the obstacle Ob in this manner. For example, Reference [1] discloses a method of segmenting each voxel of three-dimensional information using a learned convolutional neural network (CNN). Reference [2] discloses a method of segmenting a two-dimensional image and mapping the two-dimensional image to three-dimensional information. However, in these methods, a huge recognizer is needed, and processing time also becomes long. Therefore, a method of segmenting the obstacle Ob with low resources in a short time is desired.

Figure 2:
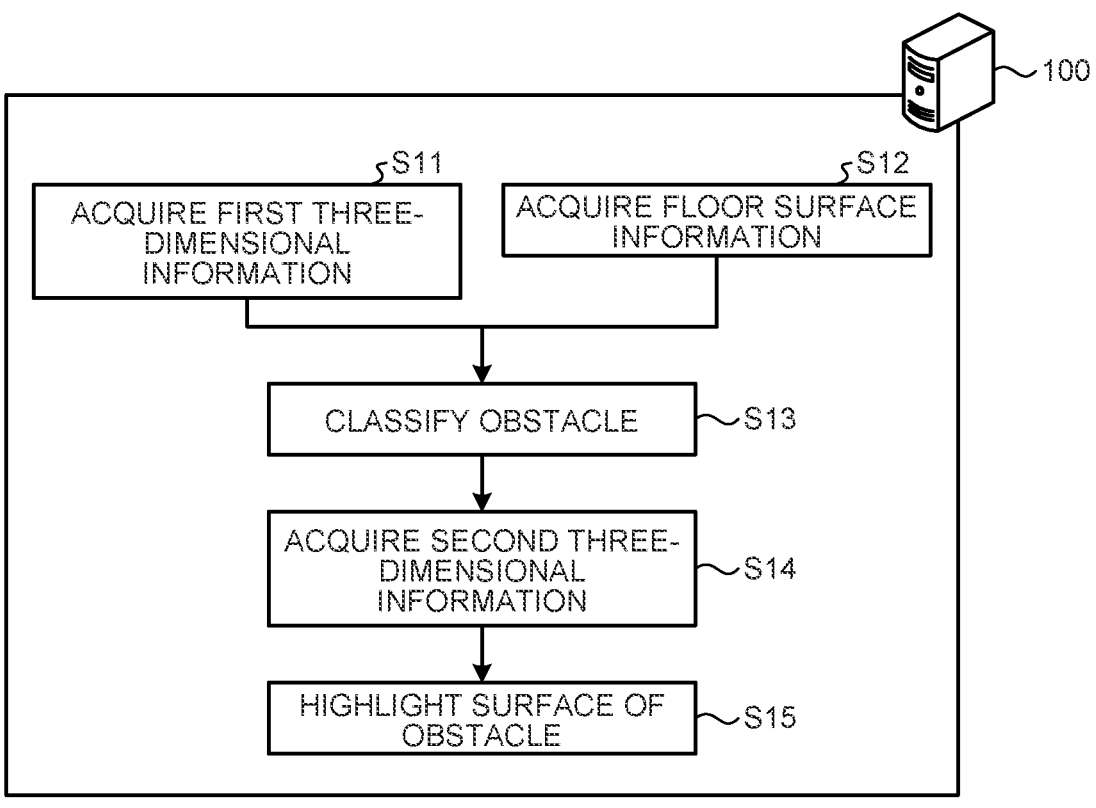
FIG. 2 is a diagram illustrating an outline of an obstacle display process according to an embodiment of the present disclosure.

Therefore, the information processing system 1 according to the present disclosure executes an obstacle display process to detect an obstacle in the play area PA. FIG. 2 is a diagram illustrating an outline of the obstacle display process according to the embodiment of the present disclosure. For example, the information processing apparatus 100 executes the obstacle display process illustrated in FIG. 2.

As illustrated in FIG. 2, the information processing apparatus 100 acquires first three-dimensional information (Step S11). The first three-dimensional information is, for example, information regarding an occupancy probability of the object in the real space in which the user U exists. An example of the first three-dimensional information is an occupancy grid map.

The information processing apparatus 100 acquires floor surface information (Step S12). The floor surface information is, for example, information regarding a floor surface in the real space.

The information processing apparatus 100 classifies an obstacle based on the first three-dimensional information and the floor surface information (Step S13). The information processing apparatus 100 excludes information corresponding to the floor surface from the first three-dimensional information, and classifies the obstacle from remaining information. When the first three-dimensional information is the occupancy grid map (hereinafter also referred to as an occupancy map), the information processing apparatus 100 classifies the obstacle by excluding voxels corresponding to the floor surface and clustering voxels that are in contact with each other among voxels in an occupied state. Details of obstacle classification will be described later.

The information processing apparatus 100 acquires second three-dimensional information (Step S14). The second three-dimensional information is information regarding a surface shape of the object in the real space where the user U exists. The second three-dimensional information includes, for example, mesh data defining a surface by a plurality of vertices and a side connecting the plurality of vertices.

The information processing apparatus 100 highlights a surface of the classified obstacle (Step S15). For example, the information processing apparatus 100 highlights the surface of the obstacle by changing a display color of the mesh data corresponding to the obstacle in the second three-dimensional information.

For example, the information processing apparatus 100 classifies the obstacles Ob1 and Ob2 in the play area PA by executing the obstacle display process in the play area PA illustrated in FIG. 1. The information processing apparatus 100 highlights the obstacles Ob1 and Ob2 classified.

As a result, the information processing apparatus 100 can notify the user U of the presence of the obstacles Ob1 and Ob2. Therefore, the user U can remove the obstacles Ob1, Ob2 or avoid the obstacles Ob1, Ob2 while the user U moves, so as to enjoy content (e.g., game) more safely.

In FIG. 1, the number of obstacles Ob is two, but is not limited thereto. The number of obstacles Ob may be one or three or more.

<1.2.2. Outline of Display Suppression Process>

While the obstacle is highlighted, there may be a case where a display image of an object is generated although no obstacle exists in a space, due to an influence of noise or the like. The obstacle erroneously detected as described above is also referred to as a false obstacle in the following description.

For example, it is assumed that the display image is generated based on the second three-dimensional information including the mesh data described above. By using the mesh data in this way, the information processing apparatus 100 can generate a smoother image as compared with a case of using the occupancy map. On the other hand, the second three-dimensional information including the mesh data is different from the occupancy map in that there is no unknown (unobserved state), and previous data is held until next distance information is acquired.

Figure 3:
FIG. 3 is a diagram illustrating an example of second three-dimensional information according to the embodiment of the present disclosure.

FIG. 3 is a diagram illustrating an example of the second three-dimensional information according to the embodiment of the present disclosure. As illustrated in a circled portion in FIG. 3, once noise is generated, there is a possibility that the noise is held as the second three-dimensional information for a long time. The noise may be continued to be presented to the user U as a false obstacle. Note that, in this case, it does not matter whether or not the false obstacle is highlighted.

As a technology for preventing the false obstacle from being presented to the user U, for example, technology disclosed in references [3] and [4] are known. Reference [3] discloses a mesh denoising method using a learned deep neural network (DNN). In addition, Reference [4] discloses a mesh denoising method using a model base such as a bilateral filter. However, these methods suppress unevenness based on a relationship with peripheral mesh. Therefore, it is required to suppress display of a false obstacle observed isolated from the surrounding due to erroneous depth observation.

Figure 4:
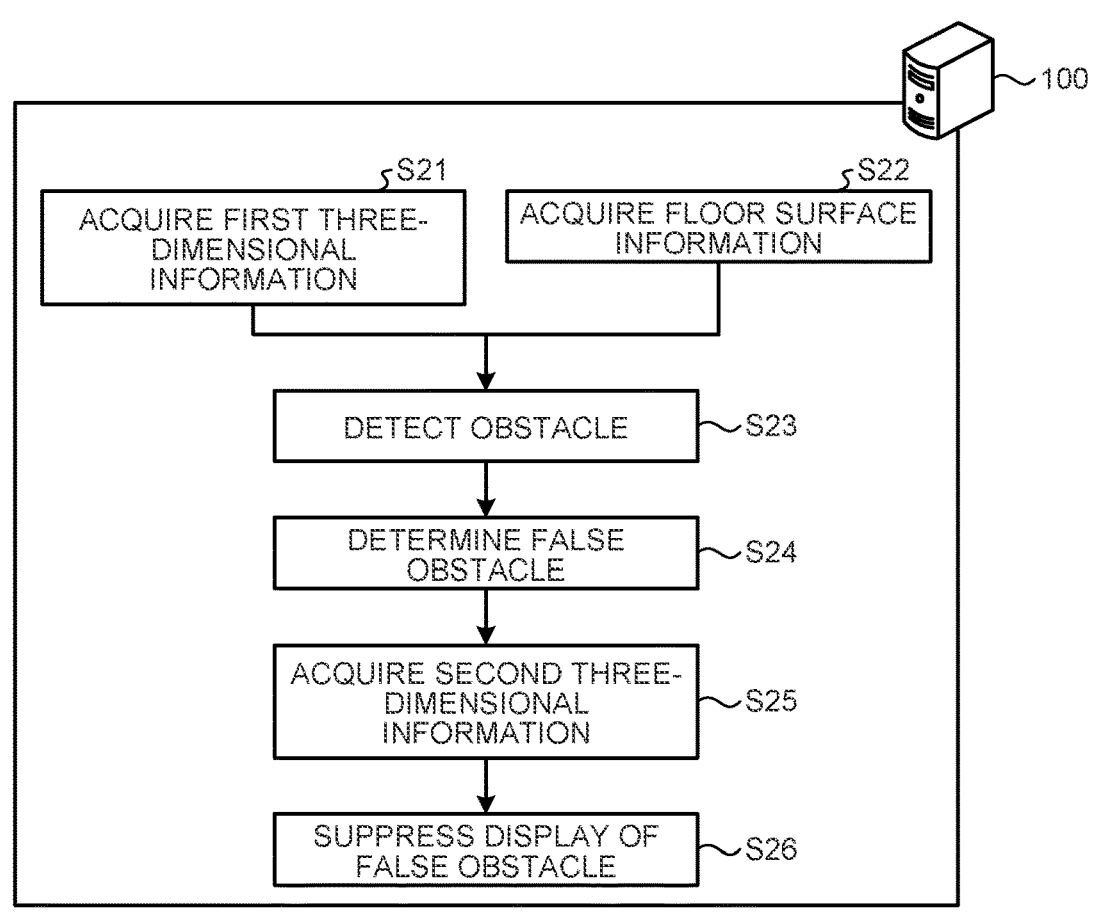
FIG. 4 is a diagram illustrating an outline of a display suppression process according to the embodiment of the present disclosure.

Accordingly, the information processing system 1 according to the present disclosure executes a display suppression process to suppress display of the false obstacle. FIG. 4 is a diagram illustrating an outline of the display suppression process according to the embodiment of the present disclosure. For example, the display suppression process illustrated in FIG. 4 is executed by the information processing apparatus 100.

As illustrated in FIG. 4, the information processing apparatus 100 acquires first three-dimensional information (Step S21). The first three-dimensional information is the same as the first three-dimensional information acquired in the obstacle display process illustrated in FIG. 2.

The information processing apparatus 100 acquires floor surface information (Step S22). The floor surface information is the same as the floor surface information acquired in the obstacle display process illustrated in FIG. 2.

The information processing apparatus 100 detects an obstacle based on the first three-dimensional information and the floor surface information (Step S23). The information processing apparatus 100 may detect an obstacle in the same manner as the method of classifying the obstacle in the obstacle display process illustrated in FIG. 2, or may detect a voxel whose occupancy map, which is the first three-dimensional information, is occupied (occupied state) as an obstacle. The information processing apparatus 100 may detect an obstacle by a method corresponding to a predetermined condition used for determination of the false obstacle described later.

The information processing apparatus 100 determines the false obstacle from the obstacle detected (Step S24). The information processing apparatus 100 determines the false obstacle by determining an outlier rate, for the obstacle detected, according to a predetermined condition. For example, the information processing apparatus 100 determines the outlier rate according to a size (number of voxels) of the obstacle detected. The information processing apparatus 100 determines the outlier rate according to a ratio of unknown voxels (unobserved state) among voxels in a surrounding of the obstacle detected. The information processing apparatus 100 determines the outlier rate according to a temporal change in a state of the second three-dimensional information (voxel). The information processing apparatus 100 determines the outlier rate of the obstacle according to a height of the obstacle from the floor surface. Note that details of the method of determining the outlier rate by the information processing apparatus 100 will be described later.

The information processing apparatus 100 acquires second three-dimensional information (Step S25). The second three-dimensional information is the same as the second three-dimensional information acquired in the obstacle display process illustrated in FIG. 2.

The information processing apparatus 100 suppresses display of the false obstacle (Step S26). For example, the information processing apparatus 100 suppresses display of the false obstacle by displaying the obstacle with transmittance corresponding to the outlier rate.

As a result, the information processing apparatus 100 can notify the user U of the obstacle Ob with higher accuracy without displaying the false obstacle. Therefore, the user U can enjoy a content (e.g., game) more safely.

Note that the information processing apparatus 100 may execute both the obstacle display process and the display suppression process, or may execute at least one of the obstacle display process and the display suppression process. When executing both the obstacle display process and the display suppression process, the information processing apparatus 100 can omit one of the processes that overlap in both the obstacle display process and the display suppression process.

2. Information Processing System

<2.1. Configuration Example of Terminal Device>

Figure 5:
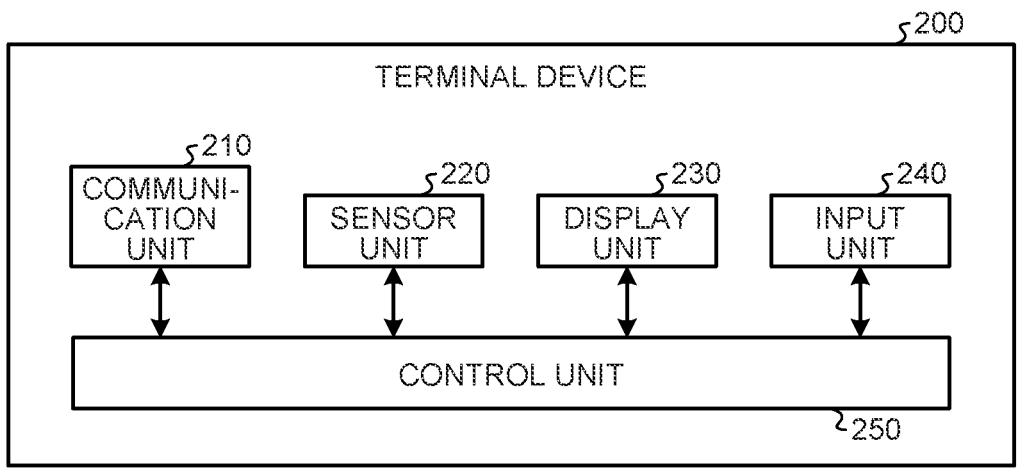
FIG. 5 is a block diagram illustrating a configuration example of a terminal device according to a first embodiment of the present disclosure.

FIG. 5 is a block diagram illustrating a configuration example of the terminal device 200 according to a first embodiment of the present disclosure. As illustrated in FIG. 5, the terminal device 200 includes a communication unit 210, a sensor unit 220, a display unit 230, an input unit 240, and a control unit 250.

[Communication Unit 210]

The communication unit 210 transmits and receives information to and from another device. For example, the communication unit 210 transmits a video reproduction request and a sensing result of the sensor unit 220 to the information processing apparatus 100 according to the control by the control unit 250. Furthermore, the communication unit 210 receives a video to be reproduced from the information processing apparatus 100.

[Sensor Unit 220]

The sensor unit 220 may include, for example, a camera (image sensor), a depth sensor, a microphone, an acceleration sensor, a gyroscope, a geomagnetic sensor, and a global positioning system (GPS) receiver. Furthermore, the sensor unit 220 may include a speed sensor, an acceleration sensor, an angular velocity sensor (gyro sensor), and an inertial measurement unit (IMU) that integrates the speed sensor, the acceleration sensor, and the angular velocity sensor.

For example, the sensor unit 220 senses a position of the terminal device 200 in the real space (or position of the user U who uses the terminal device 200), orientation and attitude of the terminal device 200, and acceleration. Furthermore, the sensor unit 220 senses depth information around the terminal device 200. Note that, when the sensor unit 220 includes a distance measuring device that senses the depth information, the distance measuring device may be a stereo camera, or a time of flight (ToF) distance image sensor.

[Display Unit 230]

The display unit 230 displays an image according to the control by the control unit 250. For example, the display unit 230 may include a right-eye display unit and a left-eye display unit (not illustrated). In this case, the right-eye display unit projects an image using at least a partial region of a right-eye lens (not illustrated) included in the terminal device 200 as a projection surface. The left-eye display unit projects an image using at least a partial region of a left-eye lens (not illustrated) included in the terminal device 200 as the projection surface.

Alternatively, when the terminal device 200 has a goggle-type lens, the display unit 230 may project a video using at least a partial region of the goggle-type lens as the projection surface. Note that the left eye lens and the right eye lens (or goggle-type lens) may be formed of, for example, a transparent material such as resin or glass.

Alternatively, the display unit 230 may be configured as a non-transmissive display device. For example, the display unit 230 may include a liquid crystal display (LCD) or an organic light emitting diode (OLED). Note that, in this case, an image in front of the user U captured by the sensor unit 220 (camera) may be sequentially displayed on the display unit 230. As a result, the user U can visually recognize a scenery in front of the user U through the video displayed on the display unit 230.

9

[Input Unit 240]

The input unit 240 may include a touch panel, a button, a lever, a switch, and the like. The input unit 240 receives various inputs by the user U. For example, when an AI character is arranged in a virtual space, the input unit 240 may receive an input by the user U for changing a positional arrangement of the AI character.

[Control Unit 250]

The control unit 250 integrally controls the operation of the terminal device 200 using, for example, a CPU, a graphics processing unit (GPU), and a RAM built in the terminal device 200. For example, the control unit 250 causes the display unit 230 to display a video received from the information processing apparatus 100.

As an example, the terminal device 200 receives a video. In this case, the control unit 250 causes the display unit 230 to display a video portion, in the video, corresponding to the information on the position and attitude of the terminal device 200 (or user U, etc.) sensed by the sensor unit 220.

Furthermore, when the display unit 230 includes the right-eye display unit and the left-eye display unit (not illustrated), the control unit 250 generates a right-eye image and a left-eye image based on the video received from the information processing apparatus 100. Then, the control unit 250 displays the right-eye image on the right-eye display unit and displays the left-eye image on the left-eye display unit. As a result, the control unit 250 can cause the user U to view a stereoscopic video.

Furthermore, the control unit 250 may perform various recognition processes based on a sensing result of the sensor unit 220. For example, the control unit 250 may recognize, based on the sensing result, motion (e.g., user U's gesture and movement) by the user U wearing the terminal device 200.

<2.2. Configuration Example of Information Processing Apparatus>

Figure 6:
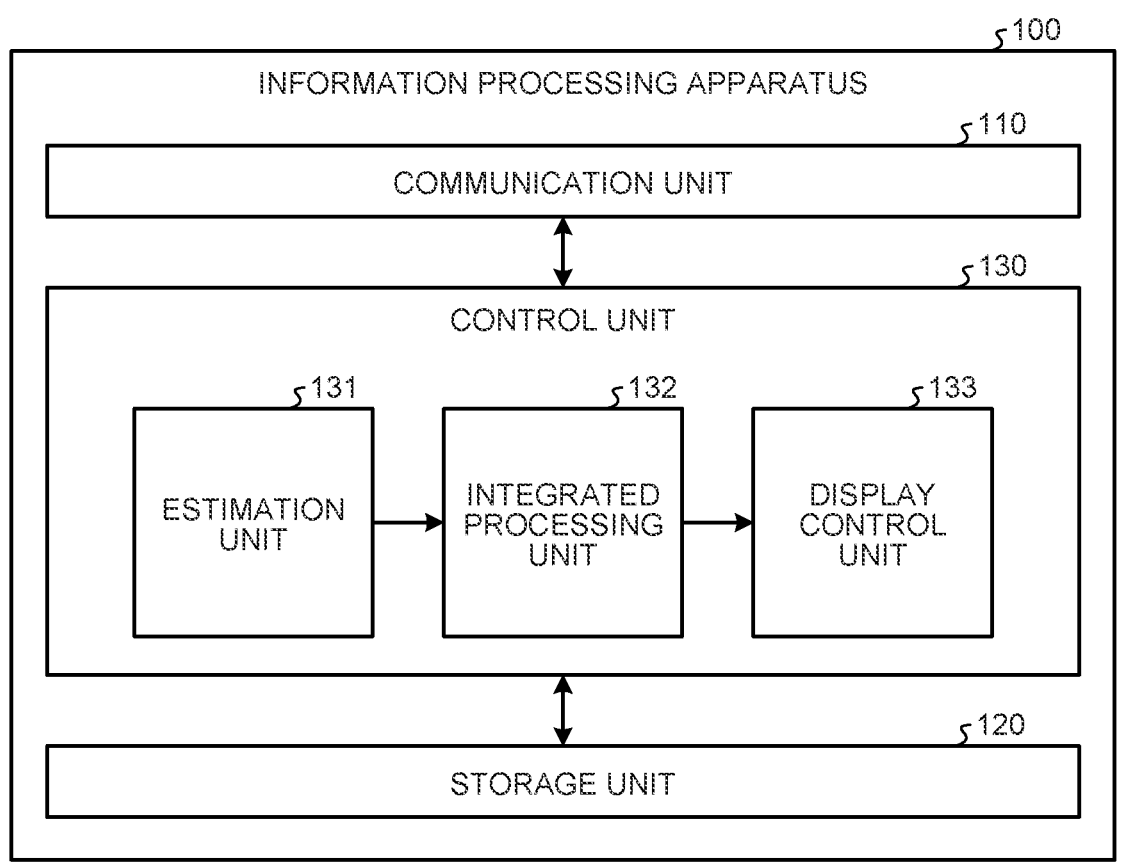
FIG. 6 is a block diagram illustrating a configuration example of an information processing apparatus according to the first embodiment of the present disclosure.

FIG. 6 is a block diagram illustrating a configuration example of the information processing apparatus 100 according to the first embodiment of the present disclosure. As illustrated in FIG. 6, the information processing apparatus 100 includes a communication unit 110, a storage unit 120, and a control unit 130.

[Communication Unit 110]

The communication unit 110 transmits and receives information to and from another device. For example, the communication unit 110 transmits a video to be reproduced to the information processing apparatus 100 according to the control by the control unit 130. Furthermore, the communication unit 110 receives a video reproduction request and a sensing result from the terminal device 200.

[Storage Unit 120]

The storage unit 120 is realized by, for example, a semiconductor memory element such as a random access memory (RAM), a read only memory (ROM), or a flash memory, or a storage device such as a hard disk or an optical disk.

[Control Unit 130]

The control unit 130 integrally controls the operation of the information processing apparatus 100 using, for example, a CPU, a graphics processing unit (GPU), and a RAM, provided in the information processing apparatus 100. For example, the control unit 130 is implemented by a processor executing various programs stored in the storage device inside the information processing apparatus 100 using a random access memory (RAM) or the like as a work area. Note that the control unit 130 may be realized by an integrated circuit such as an application specific integrated circuit (ASIC) or a field programmable gate array (FPGA). Any of the CPU, the MPU, the ASIC, and the FPGA can be regarded as a controller.

As illustrated in FIG. 6, the control unit 130 includes an estimation unit 131, an integrated processing unit 132, and a display control unit 133. Each block (estimation unit 131 to display control unit 133) configuring the control unit 130 is a functional block indicating a function of the control unit 130. These functional blocks may be software blocks or hardware blocks. For example, each of the functional blocks described above may be one software module realized by software (microprogram), or may be one circuit block on a semiconductor chip (die). It is apparent that each functional block may be one processor or one integrated circuit. A configuration method of the functional blocks is arbitrary. Note that the control unit 130 may be configured by a functional unit different from the above-described functional block.

(Estimation Unit 131)

The estimation unit 131 estimates the attitude (pose) of the terminal device 200 based on the sensing result acquired by the sensor unit 220 of the terminal device 200. For example, the estimation unit 131 acquires a measurement result of the IMU which is an example of the sensor unit 220 (e.g., acceleration and angular velocity, hereinafter also referred to as IMU information), and a photographing result of the camera (hereinafter also referred to as a camera image). The estimation unit 131 estimates a camera pose using, for example, simultaneous localization and mapping (SLAM) represented by Reference [5].

The estimation unit 131 estimates a self position/attitude (hereinafter also referred to as a camera pose) and a gravity direction of the terminal device 200 (camera that is an example of the sensor unit 220) based on the IMU information and the camera image acquired. The estimation unit 131 outputs the estimated camera pose and gravity direction to the integrated processing unit 132.

(Integrated Processing Unit 132)

The integrated processing unit 132 generates the first and second three-dimensional information based on distance information (hereinafter also referred to as depth information) that is a distance measurement result of a distance measuring device, which is an example of the sensor unit 220, and the camera pose estimated by the estimation unit 131.

Here, the first three-dimensional information is, for example, the occupancy map. The second three-dimensional information is information including the mesh data. Both the first and second three-dimensional information is information held in each voxel obtained by dividing a three-dimensional space (real space) into a voxel grid with a finite width.

Figure 7:
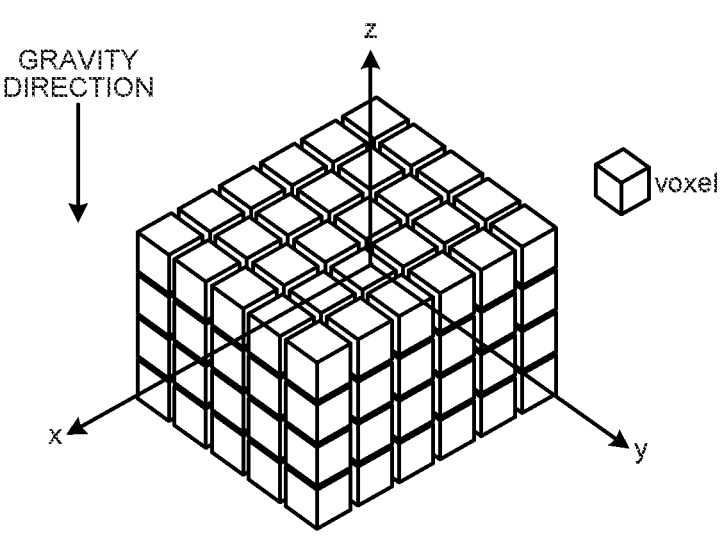
FIG. 7 is a diagram illustrating an example of voxels according to the embodiment of the present disclosure.

FIG. 7 is a diagram illustrating an example of voxels according to the embodiment of the present disclosure. Note that FIG. 7 illustrates an example in which a three-dimensional space is divided into 4×5×6=120 voxels. However, the number of voxels is not limited to 120, and may be less than 120 or 121 or more.

As illustrated in FIG. 7, the embodiment of the present disclosure uses a world coordinate system in which the gravity direction is a negative z-axis direction. In other words, the voxels of the first and second three-dimensional information are arranged according to the world coordinate system, and thus a voxel arrangement is the same for the first and second three-dimensional information.

(Mesh Information)

The integrated processing unit 132 holds, for example, distance information from an object surface in each voxel illustrated in FIG. 7. For example, the distance information is called a truncated signed distance field (TSDF). The TSDF is a known technology disclosed in, for example, Reference [6]. The integrated processing unit 132 updates the TSDF in a time direction based on the distance information.

Furthermore, the integrated processing unit 132 converts the distance information held for each voxel into a mesh by extracting an isosurface from the TSDF using, for example, the marching cube method disclosed in Reference [7]. Note that conversion from the TSDF to mesh may be performed by the integrated processing unit 132, or may be performed by the display control unit 133 described later.

Furthermore, in the present disclosure, unless otherwise specified, the second three-dimensional information is assumed to be mesh data after conversion from the TSDF to mesh, but the second three-dimensional information may be the TSDF. In addition, the TSDF held for each voxel in the three-dimensional space is also referred to as TSDF information, and information obtained by converting the TSDF information into the mesh is also referred to as the mesh information.

The integrated processing unit 132 outputs the mesh information generated to the display control unit 133.

(Occupancy Map)

The integrated processing unit 132 generates, for example, an occupancy map that holds, for example, an occupancy probability of an object in each voxel illustrated in FIG. 7. The occupancy map is, for example, three-dimensional space information described in Reference [8]

Each voxel of the occupancy map is classified into the following three states based on a threshold of the occupancy probability.

Occupied: A voxel is occupied by an object (occupied state).

Free: A voxel is not occupied by an object and is empty space (unoccupied state).

Unknown: It is not possible to determine whether a voxel is occupied by an object due to insufficient observation (unobserved state).

For example, it is assumed that a range of possible values of the occupancy probability held by each voxel is "0" to "1". In this case, when the occupancy probability is equal to or greater than a threshold $p_{occ}$, the voxel is in the occupied state. In addition, when the occupancy probability is equal to or less than the threshold $p_{free}$, the voxel is in the free state. When the occupancy probability does not satisfy the above conditions (threshold $p_{occ}$ or more or threshold $p_{free}$ or less), the voxel is in the unknown state.

The integrated processing unit 132 generates the occupancy map by updating the occupancy probability in the time direction based on the distance information. The integrated processing unit 132 outputs the generated occupancy map to the display control unit 133.

Note that both the mesh information and the occupancy map described above are a technology for expressing an object existing in a three-dimensional space. However, both of them have advantages and disadvantages.

For example, the mesh information can express a detailed surface shape of the object by holding the distance information from the object surface. On the other hand, the mesh information cannot hold the unobserved state. Therefore, as described above, for example, when wrong shape information is held in the voxel due to a depth noise, the wrong shape information is continuously displayed unless a new depth is observed in the voxel.

On the other hand, in the occupancy map, the voxel holds the non-occupied and occupied states, and thus the unobserved state can be held, although a detailed surface shape cannot be expressed. Therefore, when wrong information is held in the voxel due to depth noise, the voxel state transfers to the state of unknown unless a new depth is observed in the voxel. Furthermore, the information processing apparatus 100 may determine reliability of the predetermined voxel and an object presence interval from the state of voxels around the predetermined voxel (hereinafter also referred to as surrounding voxels), using the occupancy map.

(Plane Information)

Description returns to FIG. 6. The integrated processing unit 132 generates floor surface information from the three-dimensional information in the real space. The integrated processing unit 132 detects a floor plane, for example, by calculating the maximum plane with RANSAC with respect to the three-dimensional information. Note that the calculation of the maximum plane by RANSAC can be executed using, for example, the technology described in Reference [9]. Note that examples of the three-dimensional information are the occupancy map and the mesh information described above, or a three-dimensional point cloud obtained from the distance information.

The integrated processing unit 132 outputs the floor surface information generated to the display control unit 133.

(Display Control Unit 133)

The display control unit 133 generates a video (display image) to be reproduced by the terminal device 200. For example, the display control unit 133 generates a video of a surrounding of the user U using the mesh information. At this time, for example, the display control unit 133 generates a display image in which an obstacle in the play area PA is highlighted. In addition, the display control unit 133 generates a display image in which display of a false obstacle is suppressed.

Figure 8:
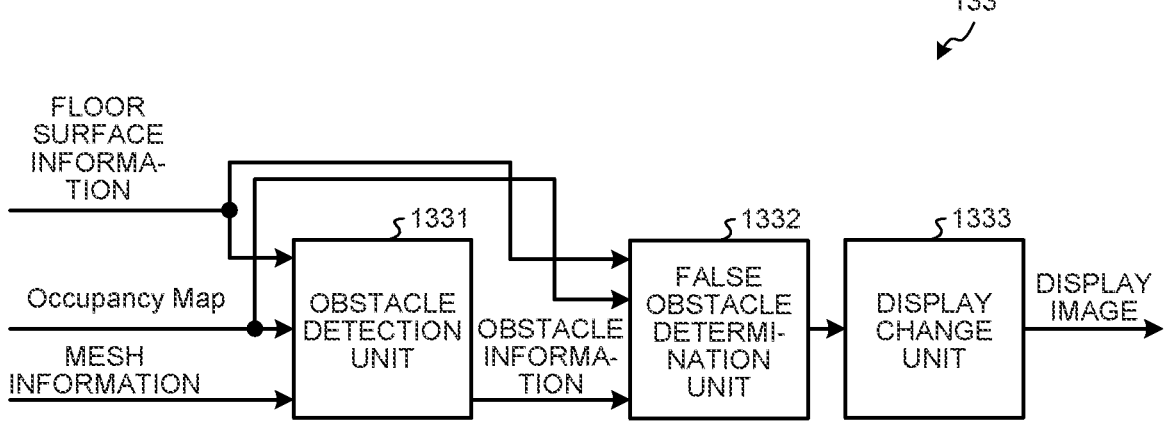
FIG. 8 is a block diagram illustrating a configuration example of a display control unit according to the embodiment of the present disclosure.

FIG. 8 is a block diagram illustrating a configuration example of the display control unit 133 according to the embodiment of the present disclosure. As illustrated in FIG. 8, the display control unit 133 includes an obstacle detection unit 1331, a false obstacle determination unit 1332, and a display change unit 1333.

(Obstacle Detection Unit 1331)

The obstacle detection unit 1331 detects an obstacle by dividing the obstacle existing in the real space using the floor surface information and the occupancy map. The obstacle detection unit 1331 generates mesh information with display label by adding, to the mesh information, display information (display label) corresponding to the obstacle detected.

Figure 9:
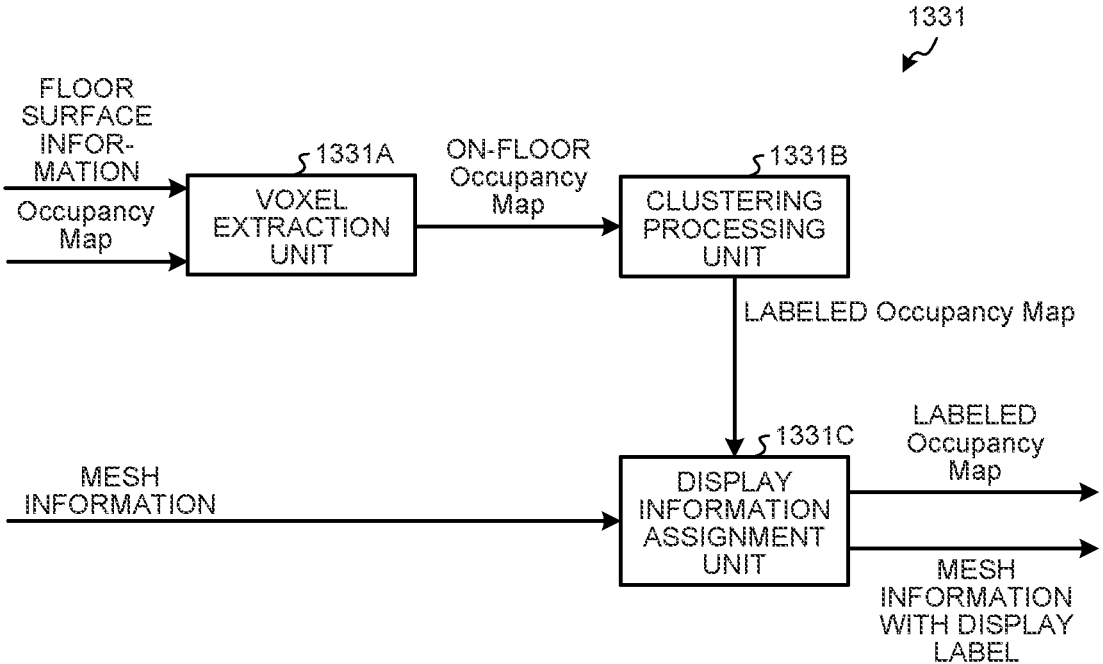
FIG. 9 is a block diagram illustrating a configuration example of an obstacle detection unit according to the embodiment of the present disclosure.

FIG. 9 is a block diagram illustrating a configuration example of the obstacle detection unit 1331 according to the embodiment of the present disclosure. The obstacle detection unit 1331 illustrated in FIG. 9 includes a voxel extraction unit 1331A, a clustering processing unit 1331B, and a display information assignment unit 1331C.

(Voxel Extraction Unit 1331A)

The voxel extraction unit 1331A uses the floor surface information and the occupancy map to extract a voxel that may become an obstacle.

For example, the voxel extraction unit 1331A selects an occupied voxel whose state is occupied among the voxels in the occupancy map. The voxel extraction unit 1331A uses the floor surface information to extract occupied voxels excluding the occupied voxels representing the floor surface, among selected occupied voxels, as voxels that may become an obstacle (hereinafter also referred to as division target voxels).

The voxel extraction unit 1331A outputs the division target voxels extracted to the clustering processing unit 1331B.

(Clustering Processing Unit 1331B)

The clustering processing unit 1331B clusters the division target voxels based on connection information of the division target voxels. The clustering processing unit 1331B classifies the division target voxels into a connected voxel group using the technology, for example, described in Reference [10].

The clustering processing unit 1331B looks at a series of division target voxels, determines that a cluster boundary has occurred at a point where the series is broken, and assigns the same label to the division target voxels within the boundary.

In this manner, the clustering processing unit 1331B classifies the division target voxels connected as one obstacle, and assigns the same label (hereinafter also referred to as an obstacle label).

Generally, obstacles in the real space are often placed on the floor surface. The division target voxels are occupied voxels excluding the floor surface. Therefore, by dividing the division target voxels based on the connection information of the division target voxels excluding the floor surface by the clustering processing unit 1331B, the clustering processing unit 1331B can detect individual obstacles on the floor surface.

Figure 10:
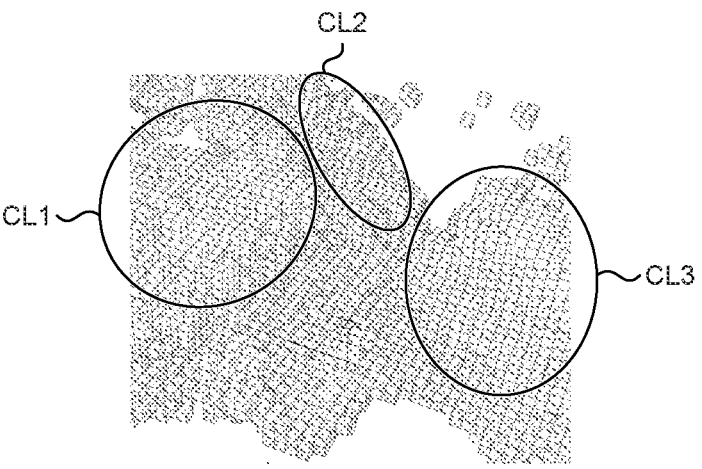
FIG. 10 is a diagram illustrating an example of an obstacle detected by a clustering processing unit according to the embodiment of the present disclosure.

FIG. 10 is a diagram illustrating an example of obstacles detected by the clustering processing unit 1331B according to the embodiment of the present disclosure. As illustrated in FIG. 10, the clustering processing unit 1331B detects, for example, three circled obstacles by clustering the division target voxels, and assigns obstacle labels CL1 to CL3, respectively.

Although the voxels to which the obstacle labels CL1 to CL3 are assigned are connected via the floor surface, the clustering processing unit 1331B can detect the obstacles more accurately by extracting the division target voxels from which the floor surface has been removed by the voxel extraction unit 1331A.

The description returns to FIG. 9. The clustering processing unit 1331B outputs, to the display information assignment unit 1331C, labeled occupancy map to which the obstacle label CL is assigned.

(Display Information Assignment Unit 1331C)

The display information assignment unit 1331C assigns a display label to the mesh data corresponding to the voxel to which the obstacle label CL is assigned in the mesh information. The display information assignment unit 1331C generates the mesh information with display label by assigning the display label to the mesh data. The mesh data corresponding to the voxel to which the obstacle label CL is assigned is mesh data calculated from the TSDF information held in the voxel. In addition, the display label is the display information used for changing the display in a subsequent process.

Note that the display information given to the mesh data is not limited to the display label. The information added to the mesh data may be any information that can be used in a subsequent highlight display process, and may be, for example, the meta information.

In this case, the display information assignment unit 1331C assigns the display label to the mesh data calculated from the TSDF information. However, the present disclosure is not limited thereto. The display information assignment unit 1331C may assign the display label to the TSDF information. In this case, the display information assignment unit 1331C generates the mesh information with display label by assigning the display label to the TSDF information held in the voxel to which the obstacle label CL is assigned.

Figure 11:
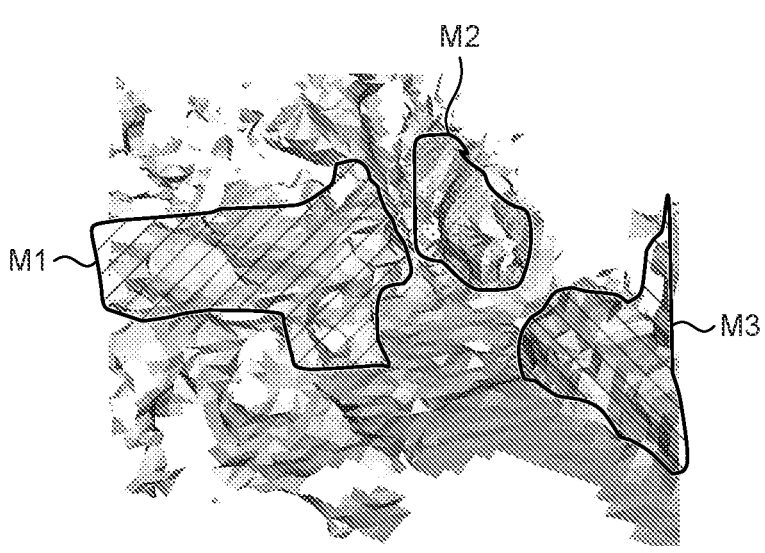
FIG. 11 is a diagram illustrating mesh information with display label according to the embodiment of the present disclosure.

FIG. 11 is a diagram illustrating the mesh information with display label according to the embodiment of the present disclosure. The display change unit 1333 described later generates a display image in which the mesh data with display label is highlighted.

As illustrated in FIG. 11, the display change unit 1333 generates a display image in which mesh regions M1 to M3 corresponding to the obstacle labels CL1 to CL3 (see FIG. 10) are highlighted.

Since the display information assignment unit 1331C generates the mesh information with display label in this manner, the information processing apparatus 100 can generate the display image with highlighted obstacles.

The description returns to FIG. 9. The display information assignment unit 1331C outputs, to the false obstacle determination unit 1332, the labeled occupancy map and the mesh information with display label. The labeled occupancy map and the mesh information with display label are also collectively referred to as obstacle information.

(False Obstacle Determining Unit 1332)

The description returns to FIG. 8. The false obstacle determination unit 1332 determines whether or not an object that is an obstacle in the real space is a false obstacle, such as noise, based on the floor surface information, the occupancy map, and the obstacle information. The false obstacle determination unit 1332 determines whether or not the obstacle is the false obstacle by determining an outlier rate of each obstacle. For example, the false obstacle determination unit 1332 determines the outlier rate of the voxel in the occupied state according to a predetermined condition.

Figure 12:
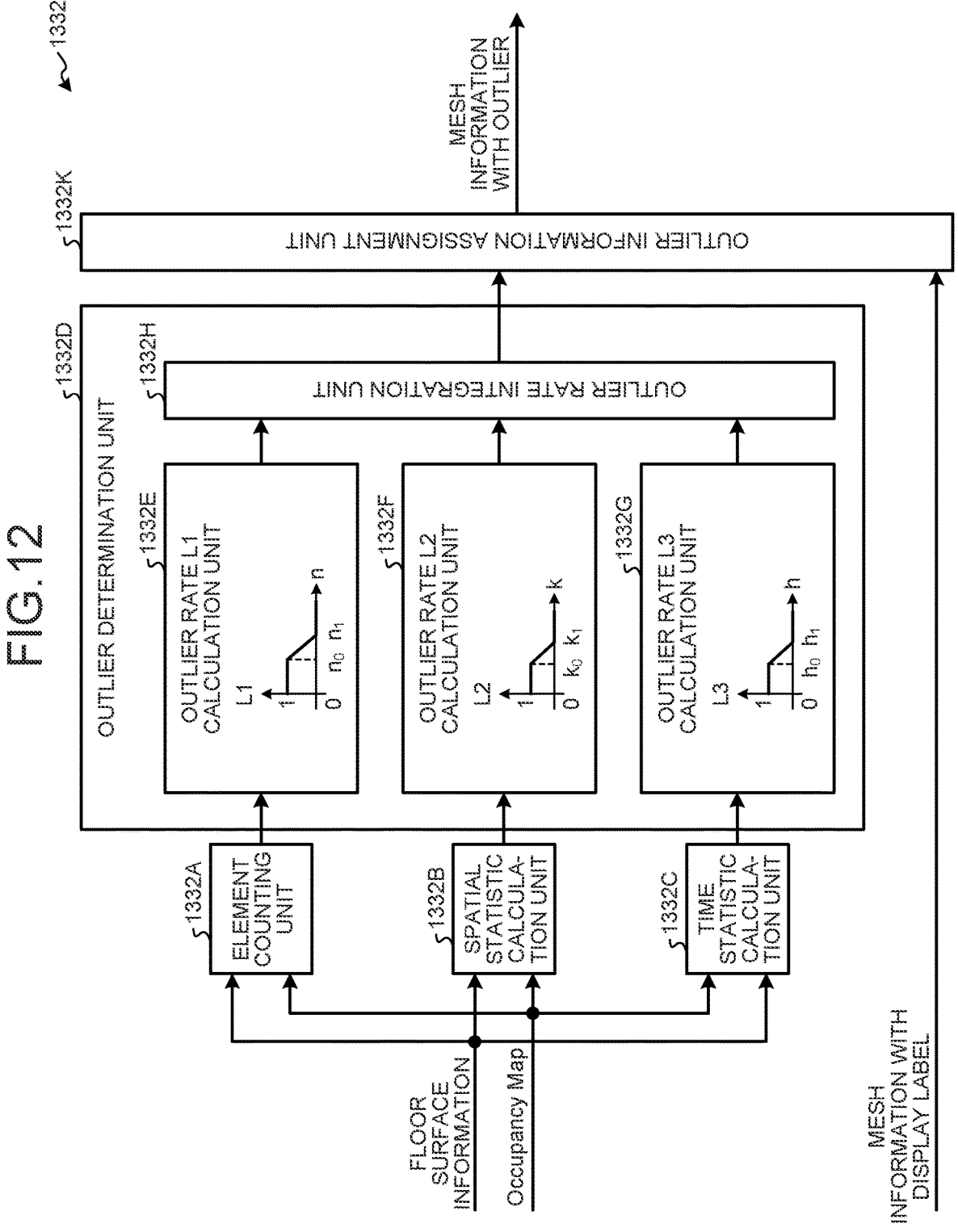
FIG. 12 is a diagram illustrating a configuration example of a false obstacle determination unit according to the embodiment of the present disclosure.

FIG. 12 is a diagram illustrating a configuration example of the false obstacle determination unit 1332 according to the embodiment of the present disclosure. As illustrated in FIG. 12, the false obstacle determination unit 1332 includes an element counting unit 1332A, a spatial statistic calculation unit 1332B, a time statistic calculation unit 1332C, an outlier determination unit 1332D, and an outlier information assignment unit 1332K.

(Element Counting Unit 1332A)

The element counting unit 1332A calculates the number of series of the occupied voxels (the number of elements) by using the connection information of the occupied voxels among the voxels in the occupancy map. In other words, the element counting unit 1332A calculates the size of an object detected as an obstacle (occupied) in the real space.

At this time, the element counting unit 1332A may calculate the number of elements using a plurality of obstacles connected via the floor surface as one obstacle, or may calculate the number of elements of the occupied voxel excluding the floor surface.

The occupied voxels excluding the floor surface are the above-described division target voxels. Therefore, when calculating the number of elements of the occupied voxels excluding the floor surface, the element counting unit 1332A may count the number of elements of voxels to which the same obstacle label CL is assigned in the labeled occupancy map.

For example, when the information processing apparatus 100 erroneously determines that there is an obstacle (occupied), due to noise, in an area where there is no obstacle, the size of the erroneously determined obstacle (false obstacle) is often smaller than the actual obstacle.

Therefore, the element counting unit 1332A calculates the size of the obstacle (the number of elements of the occupied voxels connected), so that the outlier determination unit 1332D in a subsequent step can determine whether or not the obstacle is present.

At this time, since an obstacle close to the floor surface is likely to hinder movement of the user U, it is desirable to detect an object close to the floor surface as an obstacle even when the object is small in size. On the other hand, obstacles away from the floor surface, such as near the ceiling, often do not hinder the movement of the user U. Therefore, it is desirable to detect an object large to some extent for obstacles away from the floor surface.

In other words, it is desirable that an obstacle close to the floor surface is less likely to be determined as a false obstacle even when the size is small. In addition, it is desirable that an obstacle far from the floor surface is likely to be determined as a false obstacle when the size is small. In this way, a criteria for determining whether the obstacle is a false obstacle depends on a distance from the floor surface.

Therefore, the element counting unit 1332A calculates the height, from the floor surface, of the obstacle (connected occupied voxels) whose number of elements has been counted. The element counting unit 1332A calculates the minimum distance among distances between the counted elements (voxels) and the floor surface as the height from the floor surface. Alternatively, the element counting unit 1332A may calculate the minimum distance among the distances between the counted elements and the floor surface as the height from the floor surface, or may calculate an average value as the height from the floor surface. Alternatively, the element counting unit 1332A may calculate the height from the floor surface for each voxel included in the obstacle.

The element counting unit 1332A outputs the number of elements counted and the height information regarding the height from the floor surface to the outlier determination unit 1332D.

(Spatial Statistic Calculation Unit 1332B)

The spatial statistic calculation unit 1332B calculates a ratio (hereinafter also referred to as a spatial unknown ratio) of voxels in the unknown state among voxels around the object (e.g., occupied voxel).

The spatial statistic calculation unit 1332B acquires a state of 3×3×3 voxels (hereinafter also referred to as surrounding voxels) around the occupied voxel from the occupancy map, and calculates a ratio of unknown voxels among the surrounding voxels as a spatial unknown ratio.

When a voxel is determined as occupied due to noise, there is a high possibility that the surrounding voxels of this voxel are not occupied voxels, such as unknown voxels.

Therefore, the spatial statistic calculation unit 1332B calculates the spatial unknown ratio, so that the outlier determination unit 1332D in a subsequent step can determine whether the occupied voxel is an obstacle.

Note that, similarly to the number of elements, when a determination criterion for the false obstacle is changed according to the height of the occupied voxel from the floor surface, the spatial statistic calculation unit 1332B calculates the height, from the floor surface, of the occupied voxel for which the spatial unknown ratio has been calculated.

The spatial statistic calculation unit 1332B outputs the calculated spatial unknown ratio and the height information regarding the height from the floor surface to the outlier determination unit 1332D.

Here, the number of surrounding voxels is 27, but the number is not limited thereto. The number of surrounding voxels may be less than 27, or may be 28 or more.

(Time Statistic Calculation Unit 1332C)

The time statistic calculation unit 1332C calculates a ratio of a temporal change in the state of the occupancy map as a time unknown ratio.

For example, it is assumed that the information processing apparatus 100 includes a buffer (not illustrated) for past ten frames that stores a state of target voxel that is a calculation target of the time unknown ratio. For example, the buffer is assumed to be included in the storage unit 120.

The time statistic calculation unit 1332C acquires the state of the target voxel for past ten frames from the buffer, and then calculates a ratio of the unknown state among the ten frames as the time unknown ratio.

For example, when the state returns to unknown after a few frames although the state of the target voxel once transitions from unknown to occupied or free, it is assumed that most of the ten frames are unknown. In this case, there is a high possibility that the target voxel has transitioned to occupied or free due to depth noise.

Therefore, the time statistic calculation unit 1332C calculates the time unknown ratio, so that the outlier determination unit 1332D in the subsequent step can determine whether the target voxel represents an obstacle.

When the time statistic calculation unit 1332C stores the state of the target voxel in the buffer, the time statistic calculation unit 1332C switches whether or not to store the state depending on whether or not the target voxel is within a ranging range of the distance measuring device.

As described above, the state of the occupancy map is updated according to the passage of time. At this time, when the target voxel is out of the ranging range of the distance measuring device, reliability of the state of the target voxel becomes low, and the state transitions to unknown.

Therefore, when the time statistic calculation unit 1332C stores the state of the voxel in the buffer, although the target voxel is out of the ranging range, many unknown states are stored as the state of the target voxel even when the target voxel represents an actual object.

Therefore, the time statistic calculation unit 1332C according to the embodiment of the present disclosure stores the state of the voxel in the buffer when the target voxel falls within the ranging range. In other words, the time statistic calculation unit 1332C determines whether the state of the target voxel has changed based on the ranging range of the distance measuring device. The time statistic calculation unit 1332C calculates the time unknown ratio according to the temporal change of the state when the target voxel is within the ranging range of the distance measuring device.

Figure 13:
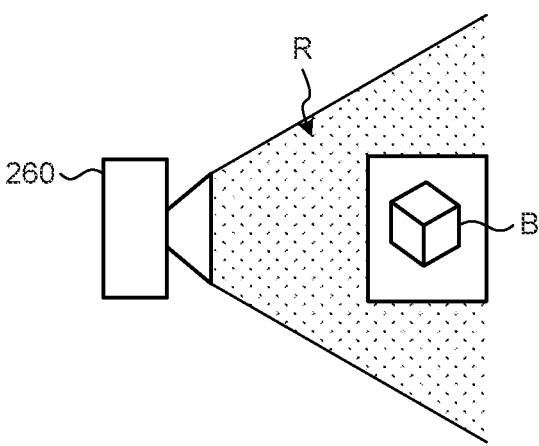
FIG. 13 is a diagram illustrating a relationship between a target voxel and a ranging range of a distance measuring device according to the embodiment of the present disclosure.
Figure 14:
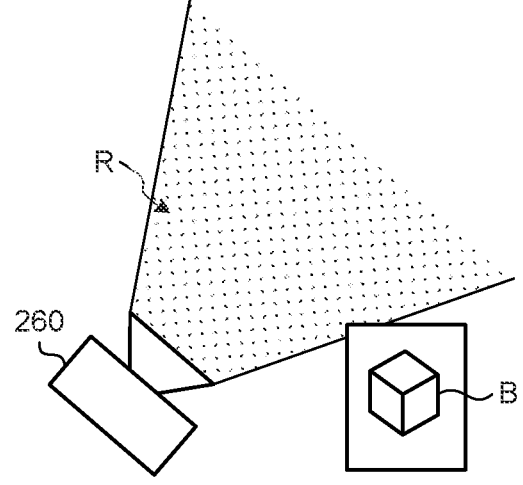
FIG. 14 is a diagram illustrating a relationship between the target voxel and the ranging range of the distance measuring device according to the embodiment of the present disclosure.

This point will be described with reference to FIGS. 13 to 15. FIGS. 13 and 14 are diagrams illustrating a relationship between the target voxel and the ranging range of the distance measuring device according to the embodiment of the present disclosure.

FIG. 13 illustrates a case where a target voxel B is included in a ranging range R of a distance measuring device 260. Furthermore, FIG. 14 illustrates a case where the target voxel B is not included in the ranging range R of the distance measuring device 260. Note that the distance measuring device 260 corresponds to, for example, the sensor unit 220 (see FIG. 5) of the terminal device 200.

As illustrated in FIGS. 13 and 14, as the ranging range R changes according to movement of the distance measuring device 260, the target voxel B is positioned within the ranging range R or positioned outside the ranging range R.

It is assumed that an object exists in the target voxel illustrated in FIGS. 13 and 14.

An example of state transition of the target voxel B in this case will be described with reference to FIG. 15. FIG. 15 is a diagram illustrating an example of the state transition of the target voxel B according to the embodiment of the present disclosure.

Figure 15:
FIG. 15 is a diagram illustrating an example of state transition of the target voxel according to the embodiment of the present disclosure.

In the example in FIG. 15, it is assumed that the target voxel is included in the ranging range R in periods T1 and T3 (see FIG. 13), and the target voxel is not included in the ranging range R in a period T2 (see FIG. 14).

FIG. 15 illustrates a state in each period, a time unknown ratio, and the like for each frame. Here, the state transition of the target voxel B up to the 16th frame is illustrated when the first frame is a start of observation. In FIG. 15, it is assumed that the buffer holds the state of the target voxel B for three frames.

As illustrated in FIG. 15, when the distance measuring device 260 starts observing the target voxel B at the beginning of the period T1, a presence probability calculated by the information processing apparatus 100 gradually increases. Therefore, the target voxel B in the unknown (Un) state in the first frame transitions to the occupied (Occ) state in the second frame.

In the first and second frames, since the target voxel B is located within the ranging range R, the time statistic calculation unit 1332C determines Yes (within observation range) when determining whether or not the target voxel B is within the observation range. In this case, the time statistic calculation unit 1332C stores the state of the target voxel B in the buffer.

Note that, in the first and second frames, since the state for three frames is not accumulated in the buffer, the time statistic calculation unit 1332C handles the time unknown ratio as not applicable (N/A) regardless of accumulation of the state in the buffer.

Since the distance measuring device 260 continues to observe the target voxel B until the sixth frame where the period T1 ends, the target voxel B becomes the occupied (Occ) state from the second frame to the sixth frame. A determination result as to whether or not the frame is within the observation range is "Yes" from the first frame to the sixth frame.

Therefore, the buffer holds the state of the target voxel B for the past three frames. Specifically, the buffer holds "Unknown", "Occupied", and "Occupied" in the second frame. In the third to sixth frames, the buffer holds "Occupied" for all the past three frames.

The time statistic calculation unit 1332C calculates a time unknown ratio of 0.33 in the second frame, and calculates a time unknown ratio of 0 in in the third to sixth frames.

Next, in the period T2, when the target voxel B becomes out of the ranging range R, the target voxel B is not observed, and the presence probability gradually decreases. Therefore, the "occupied (Occ)" state until the seventh frame also transitions to the "unknown (Un)" state from the eighth frame to the 12th frame.

However, from the seventh frame to the 12th frame, since the target voxel B is not within the observation range (determination result of the observation range is "No"), the state in this period is not held in the buffer. Therefore, the buffer continues to hold the state of the past three frames at the time of the sixth frame from the seventh frame to the 12th frame. Therefore, the time statistic calculation unit 1332C calculates the same time unknown ratio as that of the sixth frame, i.e., "0", in the seventh frame to the 12th frame.

When the period T2 ends and the period T3 comes, the target voxel B enters the ranging range R again. Therefore, when the period T3 starts, the presence probability gradually increases, and the unknown (Un) state of the target voxel B in the 13th frame transitions to the occupied (Occ) state in the 14th frame to the 16th frame. The determination result of the observation range is "Yes" from the 13th frame to the 16th frame.

Therefore, the buffer holds the state of the target voxel B for the past three frames. Specifically, the buffer holds "Occupied", "Occupied", and "Unknown" in the 13th frame. The buffer holds "Occupied", "Unknown", and "Occupied" in the 14th frame. The buffer holds "Unknown", "Occupied", and "Occupied" in the 15th frame. The buffer holds "Occupied" for all the past three frames in the 16th frame.

The time statistic calculation unit 1332C calculates a time unknown ratio of 0.33 in the 13th to 15th frames, and calculates a time unknown ratio of 0 in the 16th frame.

As described above, the time statistic calculation unit 1332C calculates the time unknown ratio according to the state change when the target voxel B is included in the ranging range R (observation range). As a result, the time statistic calculation unit 1332C can calculate the time unknown ratio with higher accuracy by excluding the case where the target voxel B transitions to unknown due to no observation.

Similarly to the number of elements, when a determination criterion for a false obstacle is changed according to the height of the occupied voxel from the floor surface, the time statistic calculation unit 1332C is assumed to calculate the height, from the floor surface, of the target voxel B for which the time unknown ratio has been calculated.

The time statistic calculation unit 1332C outputs the calculated time unknown ratio and the height information regarding the height from the floor surface to the outlier determination unit 1332D.

Note that, here, the buffer holds a state for ten frames or three frames, but the present disclosure is not limited thereto. As the number of frames held by the buffer, an appropriate value can be selected according to, for example, a buffer size and the number of target voxels B.

(Outlier Determination Unit 1332D)

Description returns to FIG. 12. The outlier determination unit 1332D calculates an outlier rate of each voxel based on calculation results of the element counting unit 1332A, the spatial statistic calculation unit 1332B, and the time statistic calculation unit 1332C.

As illustrated in FIG. 12, the outlier determination unit 1332D includes an outlier rate L1 calculation unit 1332E, an outlier rate L2 calculation unit 1332F, an outlier rate L3 calculation unit 1332G, and an outlier rate integration unit 1332H.

The outlier rate L1 calculation unit 1332E calculates a first outlier rate L1 using the number of elements calculated by the element counting unit 1332A. The outlier rate L2 calculation unit 1332F calculates a second outlier rate L2 using the spatial unknown rate calculated by the spatial statistic calculation unit 1332B. The outlier rate L3 calculation unit 1332G calculates a third outlier rate L3 using the time unknown rate calculated by the time statistic calculation unit 1332C. The outlier rate integration unit 1332H calculates an outlier rate L of each voxel from the first to third outlier rates L1 to L3.

(Outlier Rate L1 Calculation Unit 1332E)

The outlier rate L1 calculation unit 1332E determines the first outlier rate L1 according to the number of elements of an obstacle including a calculation target voxel that is a target for calculating the first outlier rate L1 among the occupied voxels. The outlier rate L1 calculation unit 1332E calculates the first outlier rate L1 based on Expression (1) below.

$$L1 = \begin{cases} 1, n < n_0 \\ 1 - \dfrac{1}{n_1 - n_0}(n - n_0), n_0 \leq n \leq n_1 \\ 0, n > n_1 \end{cases} \quad (1)$$

Here, n denotes the number of elements. In addition, $n_0$ and $n_1$ denote thresholds (parameters) determined, for example, according to the height of the obstacle from the floor surface.

In this manner, the outlier rate L1 calculation unit 1332E can determine the first outlier rate L1 according to the height of the obstacle from the floor surface by changing values of $n_0$ and $n_1$ according to the height of the obstacle from the floor surface.

(Outlier Rate L2 Calculation Unit 1332F)

The outlier rate L2 calculation unit 1332F determines the second outlier rate L2 according to the spatial unknown ratio of the occupied voxel. The outlier rate L2 calculation unit 1332F calculates the second outlier rate L2 based on Expression (2) below.

$$L2 = \begin{cases} 1, k < k_0 \\ 1 - \dfrac{1}{k_1 - k_0}(k - k_0), k_0 \leq k \leq k_1, k = 1 - \{\text{unknown ratio}\} \\ 0, k > k_1 \end{cases} \quad (2)$$

Here, k denotes the spatial known ratio, and is obtained as k=1−Spatial unknown ratio. Furthermore, $k_0$ and $k_i$ are, for example, thresholds (parameters) determined according to the height, from the floor surface, of a calculation target voxel that is a target for calculating the second outlier rate L2.

In this manner, the outlier rate L2 calculation unit 1332F can determine the second outlier rate L2 according to the height from the floor surface by changing values of $k_0$ and $k_i$ according to the height, from the floor surface, of the calculation target voxel.

(Outlier Rate L3 Calculation Unit 1332G)

The outlier rate L3 calculation unit 1332G determines the third outlier rate L3 according to the time unknown ratio of the occupied voxel. The outlier rate L3 calculation unit 1332G calculates the third outlier rate L3 based on Expression (3) below.

$$L3 = \begin{cases} 1, h < h_0 \\ 1 - \dfrac{1}{h_1 - h_0}(h - h_0), h_0 \leq h \leq h_1, h = 1 - \{\text{unknown ratio}\} \\ 0, h > h_1 \end{cases} \quad (3)$$

Here, h denotes the time known ratio, and is obtained as h=1−Time unknown ratio. In addition, $h_0$ and $h_1$ are, for example, thresholds (parameters) determined according to the height, from the floor surface, of a calculation target voxel that is a target for calculating the third outlier rate L3.

In this manner, the outlier rate L3 calculation unit 1332G can determine the third outlier rate L3 according to the height from the floor surface by changing values of $h_0$ and $h_1$ according to the height, from the floor surface, of the calculation target voxel.

20

(Outlier Rate Integration Unit 1332H)

The outlier rate integration unit 1332H integrates the first to third outlier rates L1 to L3 and determines the outlier rate L of each voxel. For example, the outlier rate integration unit 1332H calculates a weighted average of the first to third outlier rates L1 to L3 as the outlier rate L as in Expression (4).

$$L = \alpha L1 + \beta L2 + \gamma L3 \quad (4)$$
$$\alpha + \beta + \gamma = 1$$

Alternatively, the outlier rate integration unit 1332H may calculate the minimum value of the first to third outlier rates L1 to L3 as the outlier rate L as in Expression (5).

$$L = \min(L1, L2, L3) \quad (5)$$

The outlier rate integration unit 1332H outputs the determined outlier rate L to the outlier information assignment unit 1332K.

(Outlier Information Assignment Unit 1332K)

The outlier information assignment unit 1332K assigns the outlier rate L to mesh data, in the mesh information with display label, corresponding to the calculation target voxel. The outlier information assignment unit 1332K generates mesh information with outlier by assigning the outlier rate L to the mesh data. Note that the mesh data corresponding to the calculation target voxel is the mesh data calculated using the TSDF information held in a voxel that is a calculation target of the outlier rate L.

In addition, here, the outlier information assignment unit 1332K assigns the outlier rate L to the mesh data calculated from the TSDF information, but the present disclosure is not limited thereto. The outlier information assignment unit 1332K may assign the outlier rate L to the TSDF information. In this case, the outlier information assignment unit 1332K generates mesh information with outlier by assigning the outlier rate L to the TSDF information held in the calculation target voxel of the outlier rate L.

The outlier rate integration unit 1332H outputs the generated mesh information with outlier to the display change unit 1333.

(Display Change Unit 1333) Description returns to FIG. 6. The display change unit 1333 generates a two-dimensional display image to be presented to the user U based on the mesh information with outlier.

As described above, the mesh information with outlier includes at least one of the display label and the outlier rate L. The display change unit 1333 highlights the mesh data with display label. In addition, the display change unit 1333 performs suppressed display of the mesh data with outlier rate L according to the outlier rate L.

The display change unit 1333 highlights the mesh data with display label by displaying an edge line of the mesh data with display label with a shade different from that of the mesh data without display label.

Alternatively, the display change unit 1333 may highlight the mesh data with display label by displaying a face surface of the mesh data with display label with a color or hatching different from that of the mesh data without display label.

In addition, the display change unit 1333 changes transmittance of the mesh data with outlier rate L according to the outlier rate L, thereby performing suppressed display of the mesh data with outlier rate L. For example, the display change unit 1333 suppresses the display of the mesh data by setting the outlier rate L of the mesh data as the transmittance of the mesh data.

Note that the display change unit 1333 only needs to generate a display image in which the mesh data with display label is highlighted. Highlighting methods are not limited to the above-described examples. For example, the display change unit 1333 may highlight the mesh data with display label by blinking.

In addition, the display change unit 1333 only needs to make the mesh data difficult to be visually recognized by the user U according to the outlier rate L. Methods of making the mesh data difficult to be visually recognized, that is, suppressing the display are not limited to the above-described example. For example, the display change unit 1333 may set the transmittance of the mesh data with outlier rate L of a predetermined value or more to 100%, or set the color to be same as a background color.

The display change unit 1333 transmits the generated display image to the terminal device 200 via the communication unit 110.

3. Example of Information Processing

<3.1. Image Generation Process>

Figure 16:
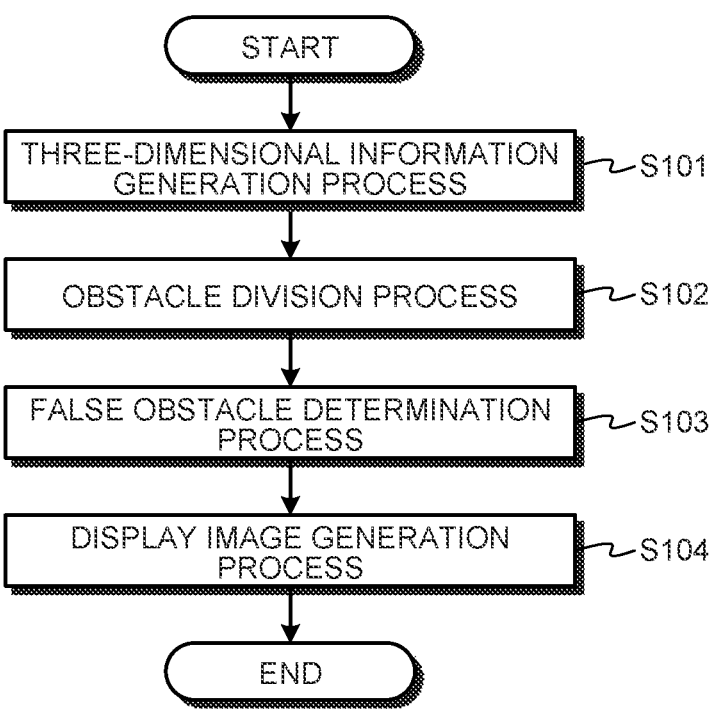
FIG. 16 is a flowchart illustrating an example of a flow of an image generation process according to the embodiment of the present disclosure.

FIG. 16 is a flowchart illustrating an example of a flow of an image generation process according to the embodiment of the present disclosure. For example, the image generation process illustrated in FIG. 16 is executed in a predetermined cycle by the information processing apparatus 100. Note that the predetermined cycle may be same as a distance measurement cycle (frame cycle) of the distance measuring device.

As illustrated in FIG. 16, the information processing apparatus 100 executes a three-dimensional information generation process (Step S101). As the three-dimensional information generation process, the information processing apparatus 100 estimates the camera pose and the gravity direction from, for example, the IMU information and the camera image acquired from the terminal device 200. The information processing apparatus 100 generates the occupancy map and the mesh information using the camera pose, the gravity direction, and the distance information acquired from the terminal device 200.

The information processing apparatus 100 executes an obstacle division process by using the occupancy map and the mesh information (Step S102) to generate the mesh information with display label. The obstacle division process will be described later.

The information processing apparatus 100 executes a false obstacle determination process using the occupancy map and the mesh information (Step S103) to generate the mesh information with outlier. The false obstacle determination process will be described later.

The information processing apparatus 100 executes a display image generation process using the mesh information with outlier (Step S104) to generate a display image. The display image generation process will be described later.

<3.2. Obstacle Division Process>

Figure 17:
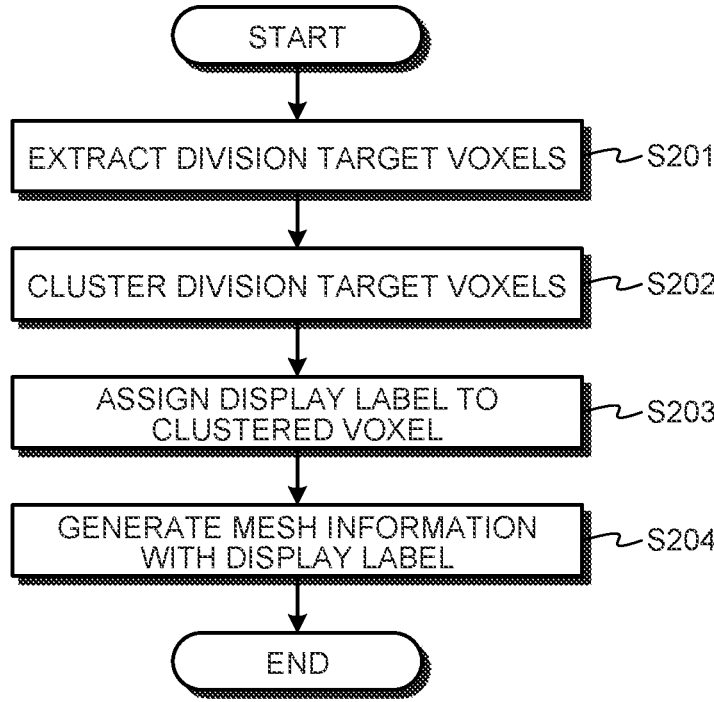
FIG. 17 is a flowchart illustrating an example of a flow of an obstacle division process according to the embodiment of the present disclosure.

FIG. 17 is a flowchart illustrating an example of a flow of the obstacle division process according to the embodiment of the present disclosure. The obstacle division process illustrated in FIG. 17 is executed in Step S102 of the image generation process in FIG. 16.

The information processing apparatus 100 extracts the division target voxels using the occupancy map and the floor surface information (Step S201). The information processing apparatus 100 selects occupied voxels in the occupied state among the voxels in the occupancy map. Using the floor surface information, the information processing apparatus 100 extracts, as division target voxels, the occupied voxels excluding the occupied voxels of the floor surface from the selected occupied voxels.

The information processing apparatus 100 clusters the extracted division target voxels (Step S202). The information processing apparatus 100 assigns the display label to the clustered voxels (Step S203), and generates the mesh information with display label (Step S204).

<3.3. False Obstacle Determination Process>

Figure 18:
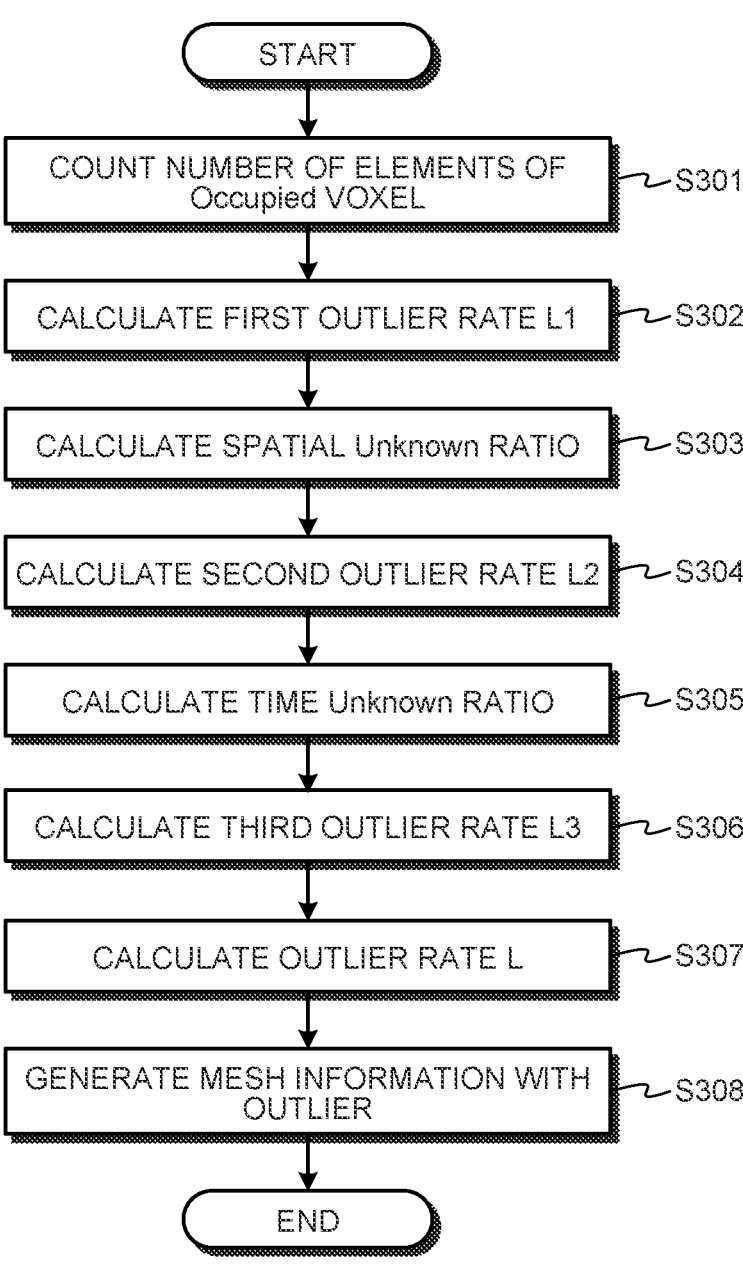
FIG. 18 is a flowchart illustrating an example of a flow of a false obstacle determination process according to the embodiment of the present disclosure.

FIG. 18 is a flowchart illustrating an example of a flow of the false obstacle determination process according to the embodiment of the present disclosure. The false obstacle determination process illustrated in FIG. 18 is executed in Step S103 of the image generation process in FIG. 16.

The information processing apparatus 100 counts the number of elements of the occupied voxel by using the connection information of the occupied voxel among the voxels in the occupancy map (Step S301). The information processing apparatus 100 calculates the first outlier rate L1 according to the number of elements counted (Step S302).

The information processing apparatus 100 calculates the spatial unknown ratio using the surrounding voxels of the occupied voxel among the voxels in the occupancy map (Step S303). The information processing apparatus 100 calculates the second outlier rate L2 according to the spatial unknown ratio (Step S304).

The information processing apparatus 100 calculates the time unknown ratio according to the temporal change in the state of the occupancy map (Step S305). The information processing apparatus 100 calculates the third outlier rate L3 according to the time unknown ratio (Step S306).

The information processing apparatus 100 calculates the outlier rate L based on the first to third outlier rates L1 to L3 (Step S307), and generates the mesh information with outlier (Step S308).

<3.4. Display Image Generation Process>

Figure 19:
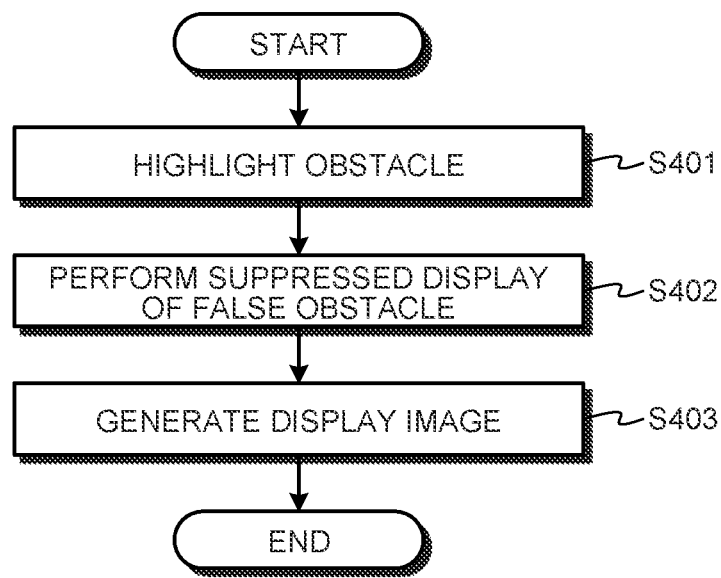
FIG. 19 is a flowchart illustrating an example of a flow of a display image generation process according to the embodiment of the present disclosure.

FIG. 19 is a flowchart illustrating an example of a flow of the display image generation process according to the embodiment of the present disclosure. The display image generation process illustrated in FIG. 19 is executed in Step S104 of the image generation process in FIG. 16.

As illustrated in FIG. 19, the information processing apparatus 100 highlights the obstacle Ob based on the display label of the mesh information with outlier (Step S401). For example, the information processing apparatus 100 highlights the obstacle Ob by highlighting the mesh data with display label.

The information processing apparatus 100 performs suppressed display of the false obstacle based on the outlier rate L of the mesh information with outlier (Step S402). For example, the information processing apparatus 100 sets the outlier rate L as the transmittance. The information processing apparatus 100 changes the transparency at the time of mesh display of the false obstacle such that the mesh in the voxel is not displayed as the transmittance becomes close to 1.

The information processing apparatus 100 generates a display image in which the display of the obstacle is highlighted and the display of the false obstacle is suppressed (Step S403).

As described above, the information processing apparatus 100 according to the embodiment of the present disclosure can divide the mesh data of the mesh information into obstacles by clustering the voxels in the occupancy map. In this case, since it is not necessary to use a large-scale recognizer, the information processing apparatus 100 can detect an obstacle at high speed while suppressing an increase in resources.

Furthermore, the information processing apparatus 100 can suppress display of mesh having a low reliability, in other words, having a high possibility of the false obstacle, by using voxels in the unobserved state (unknown) in the occupancy map. In particular, the information processing apparatus 100 suppresses the display of the mesh by using the size of clustered voxels, the spatial statistic (spatial unknown ratio), and the time statistic (time unknown ratio). As a result, the information processing apparatus 100 can generate a display image with higher reliability, in other words, with less false obstacles.

For example, there is an object in which an error (noise) is likely to occur by a distance measuring method of the distance measuring device 260. For example, in the case of a distance measuring device that measures a distance with a stereo camera, noise is likely to occur on a textureless surface. As described above, even when noise occurs in a specific object, the information processing apparatus 100 can generate the mesh information with higher accuracy.

As described above, the information processing apparatus 100 can detect an obstacle and determine a false obstacle with low resources at high speed. Therefore, even in the HMD system that presents the display image to the user U in real time, the information processing apparatus 100 can present the display image that highlights the obstacle to the user U while suppressing the display of the false obstacle.

As described above, the information processing apparatus 100 can present, to the user U, the display image in which the obstacle is highlighted and display of the false obstacle is suppressed with low resources at high speed. As a result, the user U can enjoy content more safely.

4. Modification

In the above-described embodiment, the information processing apparatus 100 calculates the spatial unknown ratio using 3×3×3 surrounding voxels, i.e., surrounding voxels in a cubic shape, of the occupied voxel as the predetermined condition, but the present disclosure is not limited thereto. The information processing apparatus 100 may calculate the spatial unknown ratio using surrounding voxels of 1×1×m (m is an integer of 3 or more), i.e., surrounding voxels in a rectangular parallelepiped shape.

For example, the information processing apparatus 100 uses voxels in a gravity direction in a surrounding of the occupied voxel as the surrounding voxels, and calculates the spatial unknown ratio according to the state of the surrounding voxels.

Figure 20:
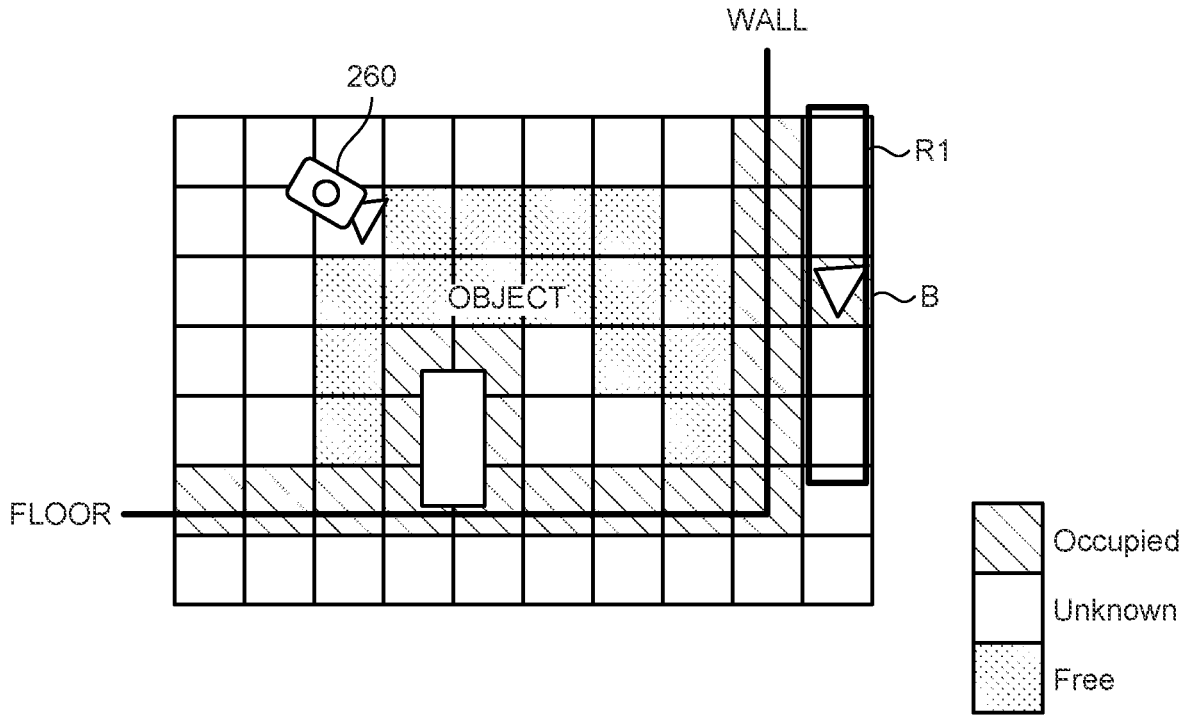
FIG. 20 is a diagram illustrating an example of a real space according to a modification of the embodiment of the present disclosure.

FIG. 20 is a diagram illustrating an example of a real space according to a modification of the embodiment of the present disclosure. As illustrated in FIG. 20, it is assumed that the real space is indoor, i.e., a space surrounded by floor and walls.

In this case, when the real space is expressed as an occupancy map, voxels (space) in which the walls, the floor, and an object (obstacle) are arranged become the occpide voxels. In addition, voxels (space) obtained by excluding occupied voxels in the ranging range of the distance measuring device 260 are free voxels. In addition, unknown voxels are outside the ranging range of the distance measuring device 260. Furthermore, voxels (space) located in a shadow of the object and cannot be measured by the distance measuring device 260 are unknown voxels.

At this time, as illustrated in FIG. 20, a region on the far side of the wall or under the floor surface is a region that is blocked by the wall or the floor and cannot be measured by the distance measuring device 260. Therefore, voxels in this region are unknown voxels. However, an occupied voxel B on the other side of the wall may be observed due to noise or the like.

In this case, when the information processing apparatus 100 calculates the spatial unknown ratio using a 3×3×3 cube as surrounding voxels, the surrounding voxels include the walls, i.e., occupied voxels, and thus the spatial unknown ratio decreases. As a result, there is a possibility that the information processing apparatus 100 cannot suppress the display of the occupied voxel B and the occupied voxel B may be displayed in the display image.

On the other hand, since there is actually no obstacle on the other side of the wall, voxels other than the occupied voxel due to noise and free voxels are unknown voxels. Therefore, there is a high probability that voxels in a z-axis direction (gravity direction) (voxels in a region R1 in FIG. 20) are unknown voxels on the other side of the wall. In other words, when the spatial unknown ratio of surrounding voxels R1 in the z-axis direction is high, there is a high possibility that the occupied voxel B is a false obstacle existing behind the wall.

Therefore, in the present modification, the information processing apparatus 100 calculates the spatial unknown ratio of the surrounding voxels R1 in the z-axis direction of the occupied voxel B. The information processing apparatus 100 determines the second outlier rate L2 according to the spatial unknown ratio, and suppresses the display of the occupied voxel B.

As described above, in the present modification, by calculating the spatial unknown ratio of the surrounding voxels R1 in the z-axis direction by the information processing apparatus 100, it is possible to determine the false obstacle on the other side of the wall (behind the wall) with higher accuracy. As a result, it is possible to suppress the display of the false obstacle with higher accuracy.

As described above, the number and shape of the surrounding voxels are not limited to the cube and the gravity direction, and may be arbitrarily set according to a position of the occupied voxel B in the real space.

5. Other Embodiments

The above-described embodiment and modification are examples, and various modifications and applications are possible.

For example, some functions of the information processing apparatus 100 of the present embodiment may be implemented by the terminal device 200. For example, the terminal device 200 may generate the mesh information with outlier.

In the above-described embodiment, the information processing apparatus 100 highlights the obstacle Ob existing in the play area PA, but the present disclosure is not limited thereto. The information processing apparatus 100 may divide (classify) and highlight the obstacle Ob existing outside the play area PA.

In the above-described embodiment, the information processing apparatus 100 or the user U sets the play area PA of the user U, but the present disclosure is not limited thereto.

For example, the information processing apparatus 100 may set, as the play area, a range in which a moving object such as a vehicle or a drone can safely move. Alternatively, the information processing apparatus 100 may set, as the play area, a range in which a partially fixed object such as a robot arm can be safely driven. Accordingly, the target object for which the information processing apparatus 100 sets the play area is not limited to the user U.

For example, a communication program for executing the above-described operation is stored and distributed in a computer-readable recording medium such as an optical disk, a semiconductor memory, a magnetic tape, or a flexible disk. Then, for example, the program is installed on a computer, and the above-described processes are executed to configure the control device. At this time, the control device may be a device (e.g., personal computer) outside the information processing apparatus 100 and the terminal device 200. Furthermore, the control device may be a device (e.g., control units 130 and 250) inside the information processing apparatus 100 and the terminal device 200.

In addition, the above communication program may be stored in a disk device included in a server device on a network such as the Internet so that the communication program can be downloaded to the computer. In addition, the above-described functions may be realized by cooperation of an operating system (OS) and application software. In this case, a portion other than the OS may be stored in a medium and distributed, or a portion other than the OS may be stored in a server device and downloaded to the computer.

Among the processes described in the above embodiments, all or part of the processes described as being performed automatically can be performed manually, or all or part of the processes described as being performed manually can be performed automatically by a known method. In addition, the processing procedure, specific name, and information including various data and parameters illustrated in the above document and the drawings can be arbitrarily changed unless otherwise specified. For example, various types of information illustrated in each drawing are not limited to the illustrated information.

In addition, each component of each device illustrated in the drawings is functionally conceptual, and is not necessarily physically configured as illustrated in the drawings. In other words, a specific form of distribution and integration of each device is not limited to the illustrated form, and all or a part thereof can be functionally or physically distributed and integrated in an arbitrary unit according to various loads, usage conditions, and the like. Note that this configuration by distribution and integration may be performed dynamically.

In addition, the above-described embodiments can be appropriately combined in a region in which the processing content do not contradict each other. Furthermore, the order of each step illustrated in the sequence diagram of the above-described embodiment can be appropriately changed.

Furthermore, for example, the present embodiment can be implemented as any configuration constituting an apparatus or a system, for example, a processor as a system large scale integration (LSI) or the like, a module using a plurality of processors or the like, a unit using a plurality of modules or the like, a set obtained by further adding other functions to a unit, or the like (i.e., configuration of a part of device).

Note that, in the present embodiment, the system means a set of a plurality of components (devices, modules (parts), etc.), and it does not matter whether or not all the components are in the same housing. Therefore, a plurality of devices housed in separate housings and connected via a network and one device in which a plurality of modules is housed in one housing are both systems.

Furthermore, for example, the present embodiments can adopt a configuration of cloud computing in which one function is shared and processed by a plurality of devices in cooperation via a network.

6. Hardware Configuration

Figure 21:
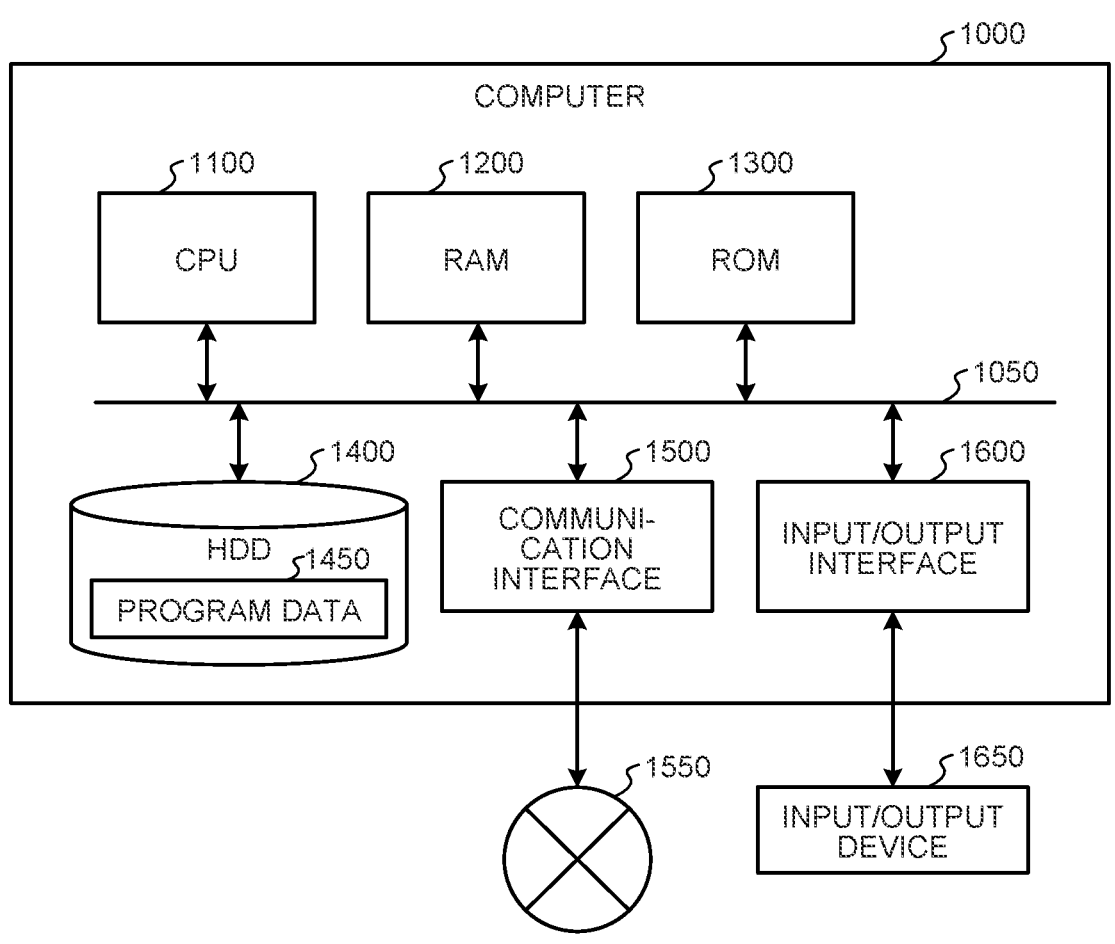
FIG. 21 is a hardware configuration diagram illustrating an example of a computer that implements functions of the information processing apparatus according to the embodiment of the present disclosure.

The information processing apparatus such as the information processing apparatus 100 according to the embodiment described above is realized by, for example, a computer 1000 having a configuration as illustrated in FIG. 21. Hereinafter, the information processing apparatus 100 according to the embodiment will be described as an example. FIG. 21 is a hardware configuration diagram illustrating an example of the computer 1000 that implements the functions of the information processing apparatus 100 according to the embodiment of the present disclosure. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates based on a program stored in the ROM 1300 or the HDD 1400, and controls each unit. For example, the CPU 1100 develops a program stored in the ROM 1300 or the HDD 1400 in the RAM 1200, and executes processes corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records a program for the medical arm control method, which is an example of the program data 1450, according to the present disclosure.

The communication interface 1500 is an interface for the computer 1000 to connect to an external network 1550 (e.g., the Internet). For example, the CPU 1100 receives data from another apparatus or transmits data generated by the CPU 1100 to another apparatus via the communication interface 1500.

The input/output interface 1600 is an interface for connecting an input/output device 1650 and the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Furthermore, the input/output interface 1600 may function as a media interface that reads a program or the like recorded on a predetermined computer-readable recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, when the computer 1000 functions as the information processing apparatus 100 according to the embodiment of the present disclosure, the CPU 1100 of the computer 1000 implements the functions of the control unit 130 and the like by executing a program loaded on the RAM 1200. Note that the CPU 1100 reads the program data 1450 from the HDD 1400 and executes the program data 1450.

However, as another example, an information processing program may be acquired from another device via the external network 1550.

Furthermore, the information processing apparatus 100 according to the present embodiment may be applied to a system including a plurality of devices on the premise of connection to a network (or communication between devices), such as cloud computing. In other words, for example, the information processing apparatus 100 according to the present embodiment described above can be implemented as the information processing system 1 according to the present embodiment by the plurality of devices.

An example of the hardware configuration of the information processing apparatus 100 has been described above. Each of the above-described components may be configured using a general-purpose member, or may be configured by hardware specialized for the function of each component. This configuration can be appropriately changed according to a technical level at the time of implementation.

7. Conclusion

Although the embodiments of the present disclosure have been described above, the technical scope of the present disclosure is not limited to the above-described embodiments as it is, and various modifications can be made without departing from the gist of the present disclosure. In addition, the components of different embodiments and modifications may be appropriately combined.

Note that the effects of each embodiment described in the present specification are merely examples and not limited thereto, and other effects may be provided.

The present technology can also have the following configurations.

(1)

An information processing apparatus comprising a control unit, the control unit being configured to:

acquire first three-dimensional information related to an occupancy probability of an object in a real space and second three-dimensional information related to an estimation result of a surface shape of the object, classify the object based on the first three-dimensional information and floor surface information related to a floor surface in the real space, and highlight a surface of the object classified based on the second three-dimensional information.

(2)

The information processing apparatus according to (1), wherein the control unit is configured to:

determine an outlier rate of the object according to a predetermined condition based on the first three-dimensional information and the floor surface information, and change display of the object according to the outlier rate.

(3)

The information processing apparatus according to (2), wherein the control unit determines the outlier rate according to a size of the object as the predetermined condition.

(4)

The information processing apparatus according to (2) or (3), wherein the control unit determines the outlier rate according to a ratio of a voxel in an unobserved state among a plurality of the voxels in a surrounding of the object as the predetermined condition.

(5)

The information processing apparatus according to (4), wherein the control unit determines the outlier rate according to a state of the voxel in a gravity direction in the real space in the surrounding of the object.

(6)

The information processing apparatus according to any-one of (2) to (5), wherein the control unit determines the outlier rate according to a temporal change of a state of the first three-dimensional information as the predetermined condition.

(7)

The information processing apparatus according to (6), wherein the first three-dimensional information is updated based on distance information measured by a distance measuring device, and the control unit determines whether or not the state has changed based on a ranging range of the distance measuring device.

(8)

The information processing apparatus according to any-one of (2) to (7), wherein the control unit determines the outlier rate according to a height of the object from the floor surface.

(9)

The information processing apparatus according to any-one of (1) to (8), wherein the first three-dimensional information is an occupancy grid map.

(10)

The information processing apparatus according to any-one of (1) to (9), wherein the second three-dimensional information includes mesh data defining a surface by a plurality of vertices and a side connecting the plurality of vertices.

(11)

The information processing apparatus according to any-one of (1) to (10), wherein the control unit highlights the surface of the object present within a movement range of a target object moving in the real space.

(12)

An information processing method comprising:

acquiring first three-dimensional information related to an occupancy probability of an object in a real space and second three-dimensional information related to an estimation result of a surface shape of the object;

classifying the object based on the first three-dimensional information and floor surface information related to a floor surface in the real space; and highlighting a surface of the object classified based on the second three-dimensional information.

(13)

A program causing a computer to function as a control unit executing:

acquiring first three-dimensional information related to an occupancy probability of an object in a real space and second three-dimensional information related to an estimation result of a surface shape of the object;

classifying the object based on the first three-dimensional information and floor surface information related to a floor surface in the real space; and highlighting a surface of the object classified based on the second three-dimensional information.

REFERENCE SIGNS LIST

1 INFORMATION PROCESSING SYSTEM
100 INFORMATION PROCESSING APPARATUS

US 12,646,261 B2

29

110, 210 COMMUNICATION UNIT
120 STORAGE UNIT
130, 250 CONTROL UNIT
131 ESTIMATION UNIT
132 INTEGRATED PROCESSING UNIT
133 DISPLAY CONTROL UNIT
200 TERMINAL DEVICE
220 SENSOR UNIT
230 DISPLAY UNIT
230 DISPLAY UNIT
240 INPUT UNIT
260 DISTANCE MEASURING DEVICE

The invention claimed is:

1. An information processing apparatus comprising circuitry configured to:
    acquire first three-dimensional information related to an occupancy probability of an object in a real space and second three-dimensional information related to an estimation result of a surface shape of the object,
    classify the object based on the first three-dimensional information and floor surface information related to a floor surface in the real space, and
    highlight a surface of the object classified based on the second three-dimensional information.

2. The information processing apparatus according to claim 1, wherein
    the circuitry is further configured to:
      determine an outlier rate of the object according to a predetermined condition based on the first three-dimensional information and the floor surface information, and
      change display of the object according to the outlier rate.

3. The information processing apparatus according to claim 2, wherein the circuitry determines the outlier rate according to a size of the object as the predetermined condition.

4. The information processing apparatus according to claim 2, wherein the circuitry determines the outlier rate according to a ratio of a voxel in an unobserved state among a plurality of the voxels in a surrounding of the object as the predetermined condition.

5. The information processing apparatus according to claim 4, wherein the circuitry determines the outlier rate according to a state of the voxel in a gravity direction in the real space in the surrounding of the object.

6. The information processing apparatus according to claim 2, wherein the circuitry determines the outlier rate according to a temporal change of a state of the first three-dimensional information as the predetermined condition.

7. The information processing apparatus according to claim 6, wherein
    the first three-dimensional information is updated based on distance information measured by a distance measuring device, and
    the circuitry determines whether or not the state has changed based on a ranging range of the distance measuring device.

8. The information processing apparatus according to claim 2, wherein the circuitry determines the outlier rate according to a height of the object from the floor surface.

9. The information processing apparatus according to claim 1, wherein the first three-dimensional information is an occupancy grid map.

10. The information processing apparatus according to claim 1, wherein the second three-dimensional information includes mesh data defining a surface by a plurality of vertices and a side connecting the plurality of vertices.

11. The information processing apparatus according to claim 1, wherein the circuitry highlights the surface of the object present within a movement range of a target object moving in the real space.

12. An information processing method comprising:
    acquiring first three-dimensional information related to an occupancy probability of an object in a real space and second three-dimensional information related to an estimation result of a surface shape of the object;
    classifying the object based on the first three-dimensional information and floor surface information related to a floor surface in the real space; and
    highlighting a surface of the object classified based on the second three-dimensional information.

13. A non-transitory computer-readable medium having embodied thereon a program, which when executed by a computer causes the computer to execute a method, the method comprising:
    acquiring first three-dimensional information related to an occupancy probability of an object in a real space and second three-dimensional information related to an estimation result of a surface shape of the object;
    classifying the object based on the first three-dimensional information and floor surface information related to a floor surface in the real space; and
    highlighting a surface of the object classified based on the second three-dimensional information.

* * * * *